(12) United States Patent
Oda et al.

(10) Patent No.: US 10,429,955 B2
(45) Date of Patent: Oct. 1, 2019

(54) POINTER, POSITION DETECTION APPARATUS AND POSITION DETECTION METHOD

(71) Applicant: Wacom Co., Ltd., Saitama (JP)

(72) Inventors: Yasuo Oda, Saitama (JP); Sadao Yamamoto, Saitama (JP); Yoshihisa Sugiyama, Saitama (JP)

(73) Assignee: Wacom, Co., Ltd., Saitama (JP)

( * ) Notice: Subject to any disclaimer, the term of this patent is extended or adjusted under 35 U.S.C. 154(b) by 0 days.

(21) Appl. No.: 15/928,978

(22) Filed: Mar. 22, 2018

(65) Prior Publication Data
US 2018/0210568 A1    Jul. 26, 2018

Related U.S. Application Data

(63) Continuation of application No. 15/896,984, filed on Feb. 14, 2018, which is a continuation of application
(Continued)

(30) Foreign Application Priority Data

Feb. 5, 2010    (JP) ................................. 2010-024858

(51) Int. Cl.
*G06F 3/0354*    (2013.01)
*G06F 3/046*    (2006.01)
(Continued)

(52) U.S. Cl.
CPC ........ *G06F 3/03545* (2013.01); *G06F 3/0383* (2013.01); *G06F 3/044* (2013.01); *G06F 3/046* (2013.01); *G06F 3/0416* (2013.01)

(58) Field of Classification Search
CPC ...... G06F 3/033; G06F 3/0334; G06F 3/0338; G06F 3/046; G06F 3/03545; G06F 2003/04105
See application file for complete search history.

(56) References Cited

U.S. PATENT DOCUMENTS 4,158,848 A  *  6/1979  Ishima ................... G03G 15/05
                                                              346/139 C
4,263,592 A     4/1981  Takahashi et al.
(Continued)

FOREIGN PATENT DOCUMENTS

| CN | 0617088 A | 5/2005 |
|---|---|---|
| CN | 101387928 B | 7/2012 |
| EP | 1 983 408 B1 | 7/2014 |
| JP | 8-50535 A | 2/1996 |

(Continued)

OTHER PUBLICATIONS

Communication pursuant to Article 94(3) EPC dated Nov. 25, 2015, for EP Application No. 11 150 998.0-1959, 7 pages.
(Continued)

*Primary Examiner* — William Lu
(74) *Attorney, Agent, or Firm* — Seed IP Law Group LLP

(57) ABSTRACT

A position detection apparatus of the electrostatic coupling type is provided, to detect not only a position of a pointer but also information other than the position information such as, for example, pointer pressure or side switch information. The pointer transmits two codes such that a pressure applied to a pen tip is associated with a time difference between the two codes. A position detector carries out a correlation matching operation between signals generated in reception conductors and correlation calculation codes corresponding to the two codes, to thereby detect a position on a sensor section pointed to by the pointer from a result of the correlation matching operation and based on at least one of the codes. The position detector further includes a pressure calculation circuit for detecting pressure applied to the pointer, which is associated with the time difference between the two codes, from the result of the correlation matching operation calculated by the correlation matching operation and based on the two codes.

26 Claims, 15 Drawing Sheets

Related U.S. Application Data

No. 15/047,013, filed on Feb. 18, 2016, now Pat. No. 10,108,277, which is a continuation of application No. 14/542,438, filed on Nov. 14, 2014, now Pat. No. 9,529,456, which is a continuation of application No. 12/877,780, filed on Sep. 8, 2010, now Pat. No. 8,963,889.

(51) Int. Cl.
  *G06F 3/044* (2006.01)
  *G06F 3/038* (2013.01)
  *G06F 3/041* (2006.01)

(56) References Cited

U.S. PATENT DOCUMENTS

| | | |
|---|---|---|
| 4,513,437 A | 4/1985 | Chainer et al. |
| 4,725,978 A | 2/1988 | Fujioka |
| 5,117,071 A | 5/1992 | Greanias et al. |
| 5,128,624 A * | 7/1992 | Hoshino ............. G01R 25/08 327/12 |
| 5,138,118 A * | 8/1992 | Russell ............... G06F 3/046 178/19.03 |
| 5,270,664 A * | 12/1993 | McMurtry ........... G01B 7/023 324/662 |
| 5,402,151 A | 3/1995 | Duwaer |
| 5,422,959 A | 6/1995 | Lee |
| 5,484,251 A | 1/1996 | Sanda |
| 5,528,002 A * | 6/1996 | Katabami ............ G06F 3/044 178/19.06 |
| 5,600,105 A * | 2/1997 | Fukuzaki ............. G06F 3/046 178/18.07 |
| 5,672,852 A * | 9/1997 | Fukuzaki ............. G06F 3/046 178/18.07 |
| 5,736,980 A * | 4/1998 | Iguchi ................ G06F 3/03545 178/20.03 |
| 5,798,756 A * | 8/1998 | Yoshida .............. G06F 3/0412 178/20.02 |
| 6,184,873 B1 * | 2/2001 | Ward ................. G06F 3/03545 178/18.04 |
| 6,323,846 B1 * | 11/2001 | Westerman .......... G06F 3/0235 345/173 |
| 6,535,206 B1 * | 3/2003 | Xu ..................... G06F 3/0346 178/18.01 |
| 6,590,568 B1 * | 7/2003 | Astala ................ G06F 3/0486 178/18.01 |
| 6,738,050 B2 | 5/2004 | Comiskey et al. |
| 6,744,426 B1 | 6/2004 | Okamoto et al. |
| 6,930,672 B1 * | 8/2005 | Kuribayashi ....... G06F 3/04883 178/18.01 |
| 7,064,750 B2 | 6/2006 | Duret |
| 7,474,300 B2 * | 1/2009 | Katsurahira .......... G06F 1/3203 178/18.01 |
| 7,570,252 B2 | 8/2009 | Fujiwara et al. |
| 7,719,515 B2 | 5/2010 | Fujiwara et al. |
| 7,735,024 B2 * | 6/2010 | Li ....................... G06F 3/043 345/156 |
| 8,154,525 B2 | 4/2012 | Katsurahira |
| 8,253,702 B2 | 8/2012 | Katsurahira et al. |
| 8,546,706 B2 * | 10/2013 | Altman ............... G06F 3/011 178/19.02 |
| 8,581,857 B2 | 11/2013 | Matsubara |
| 8,604,365 B2 * | 12/2013 | Altman .............. G06F 1/12 178/18.04 |
| 9,201,556 B2 * | 12/2015 | Free ................... G06F 3/03545 |
| 9,632,599 B2 | 4/2017 | Oda et al. |
| 2001/0012002 A1 | 8/2001 | Tosaya |
| 2002/0148655 A1 | 10/2002 | Cho et al. |
| 2003/0095109 A1 * | 5/2003 | Sasaki ................ G06F 3/03542 345/173 |
| 2003/0112220 A1 | 6/2003 | Yang et al. |
| 2003/0142073 A1 | 7/2003 | Fukushima et al. |
| 2003/0151596 A1 | 8/2003 | Moyne et al. |
| 2003/0214490 A1 * | 11/2003 | Cool .................. G06F 3/03545 345/179 |
| 2004/0041799 A1 | 3/2004 | Vincent et al. |
| 2004/0056849 A1 | 3/2004 | Lohbihler et al. |
| 2004/0160429 A1 * | 8/2004 | Blake ................. G06F 3/03545 345/179 |
| 2004/0169439 A1 | 9/2004 | Toda |
| 2004/0201580 A1 * | 10/2004 | Fujiwara ............. G06F 3/03545 345/179 |
| 2004/0260507 A1 | 12/2004 | Chang et al. |
| 2005/0128191 A1 * | 6/2005 | Katsurahira ........ G06F 1/3203 345/179 |
| 2005/0162398 A1 | 7/2005 | Eliasson et al. |
| 2005/0162411 A1 * | 7/2005 | Berkel van ........ G06F 3/03545 345/179 |
| 2005/0171714 A1 * | 8/2005 | Ely .................... G06F 1/3203 702/75 |
| 2006/0007164 A1 * | 1/2006 | Liu .................... G06F 3/046 345/173 |
| 2006/0038791 A1 * | 2/2006 | Mackey ............... G06F 3/044 345/173 |
| 2006/0109252 A1 | 5/2006 | Kolmykov-Zotov et al. |
| 2006/0279549 A1 | 12/2006 | Zhang et al. |
| 2007/0146351 A1 * | 6/2007 | Katsurahira ........ G06F 3/03545 345/179 |
| 2007/0180923 A1 | 8/2007 | Liu et al. |
| 2007/0205996 A1 | 9/2007 | Huang |
| 2007/0227785 A1 * | 10/2007 | Katsurahira ........... G06F 3/046 178/18.07 |
| 2008/0042998 A1 * | 2/2008 | Orsley ................. G06F 3/0421 345/177 |
| 2008/0076351 A1 | 3/2008 | Washiro |
| 2008/0149402 A1 * | 6/2008 | Vos .................... G06F 3/03545 178/19.01 |
| 2008/0150918 A1 | 6/2008 | Hagen et al. |
| 2008/0156546 A1 * | 7/2008 | Hauck ................ G06F 3/03545 178/19.01 |
| 2008/0238885 A1 * | 10/2008 | Zachut ................ G06F 3/046 345/174 |
| 2008/0257613 A1 * | 10/2008 | Katsurahira ........ G06F 3/03545 178/19.04 |
| 2009/0065268 A1 * | 3/2009 | Katsurahira ........ G06F 3/03545 178/19.01 |
| 2009/0065269 A1 | 3/2009 | Katsurahira |
| 2009/0078476 A1 * | 3/2009 | Rimon ............... G06F 3/03545 178/18.03 |
| 2009/0078746 A1 * | 3/2009 | Karashima ............ H01L 24/11 228/248.1 |
| 2009/0114459 A1 | 5/2009 | Fukushima et al. |
| 2009/0128249 A1 * | 5/2009 | Katta ...................... H03H 7/20 333/17.1 |
| 2009/0139780 A1 * | 6/2009 | Katsurahira .......... G06F 1/3203 178/18.03 |
| 2009/0184940 A1 * | 7/2009 | Silk .................... G06F 1/3203 345/173 |
| 2009/0278794 A1 * | 11/2009 | McReynolds ......... G06F 3/0421 345/156 |
| 2010/0026639 A1 * | 2/2010 | Lee .................... G06F 3/0412 345/173 |
| 2010/0051356 A1 * | 3/2010 | Stern .................. G06F 3/03545 178/19.04 |
| 2010/0067674 A1 | 3/2010 | Lee |
| 2010/0085325 A1 | 4/2010 | King-Smith et al. |
| 2010/0155153 A1 * | 6/2010 | Zachut ............... G06F 3/03545 178/18.03 |
| 2010/0252335 A1 * | 10/2010 | Orsley ................ G06F 3/044 178/18.03 |
| 2010/0289758 A1 | 11/2010 | Matsubara |
| 2010/0315384 A1 * | 12/2010 | Hargreaves ......... G06F 3/03545 345/179 |
| 2010/0321315 A1 | 12/2010 | Oda et al. |
| 2011/0061948 A1 | 3/2011 | Krah et al. |
| 2011/0175916 A1 * | 7/2011 | Noris ................ G06K 9/00416 345/441 |

(56) References Cited

U.S. PATENT DOCUMENTS

2012/0050231 A1 3/2012 Westhues et al.
2013/0088465 A1* 4/2013 Geller ................ G06F 3/03545
                                                            345/179

FOREIGN PATENT DOCUMENTS

| JP | 8-234902 A | 9/1996 |
| JP | 2004-310598 A | 11/2004 |
| TW | 200305826 A | 11/2003 |
| TW | 200644402 A | 12/2006 |
| TW | 201011622 A1 | 3/2010 |

OTHER PUBLICATIONS

Extended European Search Report, dated Jul. 14, 2014, for corresponding European Application No. 11150998.0-195912354909, 6 pages.
Final Office Action dated Nov. 30, 2016, for corresponding U.S. Appl. No. 15/047,013, 22 pages.
Non-Final Office Action dated Dec. 2, 2015, for corresponding U.S. Appl. No. 14/542,438, 30 pages.
Non-Final Office Action dated Dec. 23, 2015, for corresponding U.S. Appl. No. 14/542,462, 26 pages.
Notice of Allowance, dated Aug. 17, 2016, for U.S. Appl. No. 14/542,438, 8 pages.
Office Action, dated Aug. 27, 2013, for corresponding Japanese Application No. 2010-024858, 3 pages.
Office Action, dated Jul. 22, 2014, for corresponding Israeli Application No. 208921, 4 pages.
Taiwanese Office Action dated Jan. 27, 2016, for corresponding TW Application No. 104126246, 6 pages.
Taiwanese Office Action dated May 30, 2016, for corresponding TW Application No. 104126247, 7 pages.
Taiwanese Office Action dated Jan. 29, 2016, for TW Application No. 104126245, 9 pages.

* cited by examiner

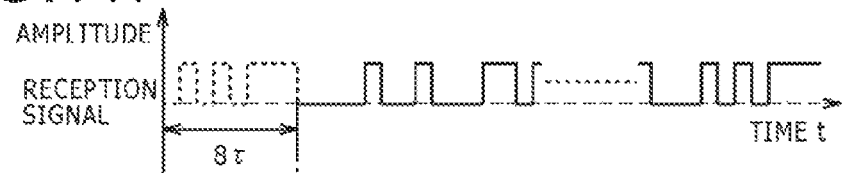
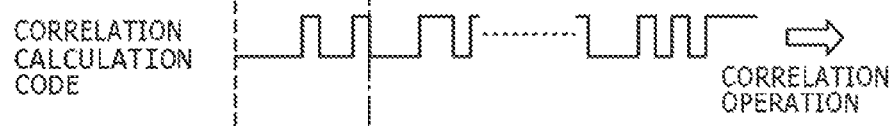
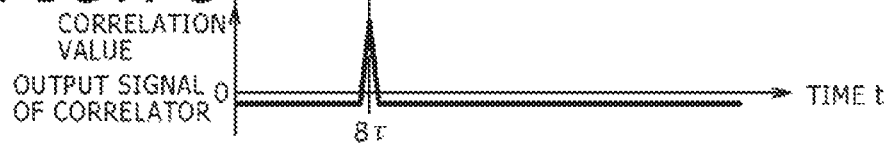
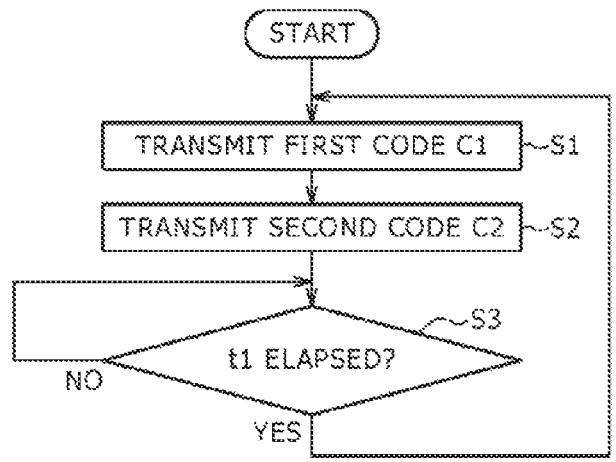

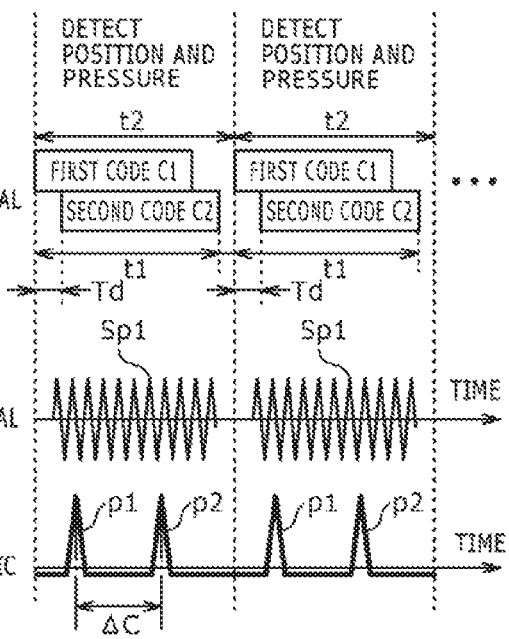
FIG. 10A TRANSMISSION SIGNAL
FIG. 10B RECEPTION SIGNAL
FIG. 10C CORRELATION CHARACTERISTIC
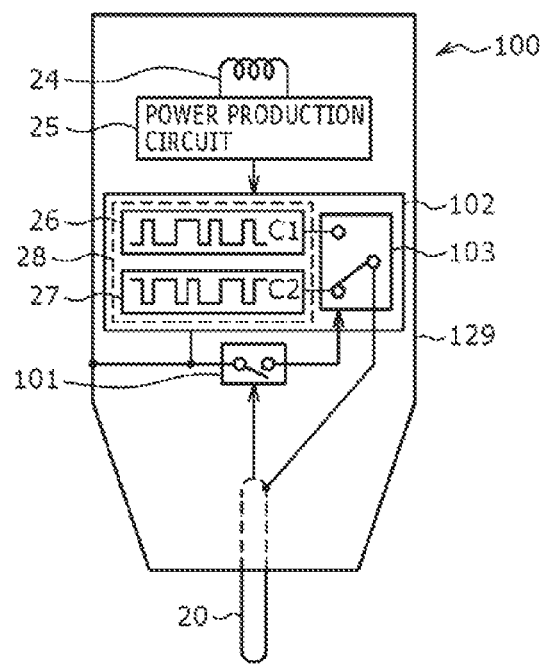
FIG. 11

BEFORE PSK MODULATION

AFTER PSK MODULATION

BEFORE FSK MODULATION

AFTER FSK MODULATION

POINTER, POSITION DETECTION APPARATUS AND POSITION DETECTION METHOD

CROSS-REFERENCE TO RELATED APPLICATION

The present application claims the benefit under 35 U.S.C. § 119(a) of Japanese Application No. 2010-024858, filed Feb. 5, 2010, the entire content of which is incorporated herein by reference.

Technical Field

This invention relates to a pointer, a position detection apparatus and a position detection method, and more particularly to a pointer, a position detection apparatus and a position detection method of the electrostatic coupling type.

Background Art

A position detection apparatus, called a tablet, has been developed as one of pointing devices used for producing an image or illustration on a computer apparatus. Such a position detection apparatus typically includes a position detector substantially in the form of a flat plate, and a pointer in the form of a pen to be operated by a user on the position detector.

As such a position detection apparatus, for example, a position detection apparatus based on an electrostatic coupling method has been developed. The position detection apparatus of the electrostatic coupling type includes, as principal components thereof, a pointer including an integrated circuit (IC) and a position detector including a sensor section having a group of conductors arrayed in a predetermined pattern. A predetermined signal is transmitted from the pointer, which is placed on the sensor section, to the conductor group, and the position pointed to by the pointer is detected by specifying the reception position of the transmission signal by the position detector.

A conventional position detection apparatus is described, for example, in Japanese Patent Laid-Open No. H8-50535.

SUMMARY OF THE INVENTION

In the position detection apparatus of the electrostatic coupling type, typically, a signal transmitted from the pointer to the sensor section is used to detect the position pointed to by the pointer. Therefore, such a position detection apparatus has a problem that, although it is possible to detect the position pointed to by the pointer, it cannot detect information other than the position information such as, for example, the pointer's pressure information (i.e., how much pressure is applied to the pointer tip by a surface of the sensor section) or pen down information, which indicates that the pointer is in contact with the position detector. Also, there is a problem that a plurality of different pointers, such as a pointer in the form of a pen and a finger as a pointer, cannot be detected at the same time.

According to one aspect, the present invention is directed to solving the problems described above. According to an aspect of the present invention, a position detection apparatus is provided, which adopts the electrostatic coupling method to detect, through use of codes for which a correlation matching operation process is carried out, not only position information representative of the position pointed to by a pointer but also information other than the position information such as, for example, pressure information, information of a rotational position where the pointer is rotated on a position detector around a pen tip (axis) thereof, or information regarding inclination of the pointer. Further, according to another aspect, the present invention makes it possible to detect information from a plurality of different pointers, such as position pointing information by a pen and a finger as a pointer, at the same time.

According to one aspect of the present invention, there is provided a position detection apparatus including a pointer having a transmission signal production section, which produces a signal based on two codes such that a pressure applied to the pointer is associated with a time difference between the two codes. The pointer transmits the signal produced by the transmission signal production section. The position detection apparatus further includes a sensor section having a plurality of first conductors disposed in a predetermined direction and a plurality of second conductors disposed in a direction crossing with the predetermined direction. The sensor section is configured to receive the signal transmitted from the pointer. The position detection apparatus further includes a correlation matching operation circuit configured to carry out a correlation matching operation between signals generated in conductors which form the plurality of first conductors and the plurality of second conductors and correlation calculation codes corresponding to the two codes. The position detection apparatus still further includes a position calculation circuit configured to detect a position on the sensor section pointed to by the pointer based on a result of the correlation matching operation calculated by the correlation matching operation circuit and based on at least one of the codes. The position detection apparatus also includes a pressure calculation circuit configured to detect the pressure applied to the pointer, which is associated with the time difference between the two codes, based on the result of the correlation matching operation calculated by the correlation matching operation circuit and based on the two codes. Further, in order to detect information other than the position information, such as the rotational position, where the pointer is rotated around a pen tip (axis) thereof on a position detector, or the inclination of the pointer, a plurality of electrode pieces divided electrically from each other are disposed around the central axis of the pointer on the pointer, and codes of different types are supplied respectively to the plurality of electrode pieces. Further, in order to detect a pointing operation by a finger simultaneously with a pointing operation by a pen, the position detector may further include a code production section and a changeover (switching) section for switching the conductors, which form the sensor section, between signal reception and signal transmission.

It is to be noted that the two codes described above may have the same code pattern or may have code patterns different from each other. Where the same code pattern is used, the same correlation calculation code corresponding to the code pattern can be used.

According to another aspect of the invention, a pointer is provided, including an end portion (pen tip) for pointing to a position. The end portion projects from a housing. The pointer also includes a code production circuit configured to produce a first code and a second code having code patterns different from each other and to control, in response to a pressure applied to the end portion of the pointer, the production timings at which the two codes are to be produced, that is, a time difference between the codes. Alternatively, the code production circuit is configured to produce one code having a predetermined code pattern and to control, in response to a pressure applied to the end portion of the pointer, the timing for next production of the code relative to the first production of the code, that is, a time difference between the codes. The pointer may also include a transmission signal production section configured to transmit the codes produced by the code production circuit.

Various exemplary embodiments of the present invention are suited where an electrostatic coupling method is used to form a position detection apparatus. First and second codes having the same code pattern or having code patterns different from each other are transmitted from a pointer, with a time difference therebetween, and received by a position detector. Then, position detection of the pointer is carried out using the first code, while information other than the position information, such as pressure information or rotational position information of the pointer, is obtained based on the time difference between the two codes.

As described above, with exemplary embodiments of the present invention, the first code and the second code having code patterns that are the same as each other or different from each other are transmitted from the pointer and, upon signal reception, a correlation matching operation between the reception signal and correlation calculation codes that respectively correspond to the first and second codes is carried out. Accordingly, not only the pointing position of the pointer but also information other than the position information such as, for example, pressure information can be detected.

BRIEF DESCRIPTION OF THE DRAWINGS

FIGS. 7A-7C are views illustrating operation of the correlator.

FIG. 8 is a flow chart illustrating an operation procedure of the pointer.

FIGS. 10A-10C are views illustrating a principle of position detection and pressure detection of the pointer, where first and second codes are transmitted in a time-multiplexed state.

FIG. 11 is a view of a general configuration of a pointer of modification 1.

DESCRIPTION OF EMBODIMENTS OF THE INVENTION

An embodiment of a position detection apparatus of the present invention is described with reference to the drawings. However, the present invention is not limited to the following embodiment.

In the present embodiment, two codes having code patterns different from each other or two codes having the same code pattern are used to detect the position of a pointer and pressure of the pointer, that is, pressure applied to the pointer. If the code to be used is, for example, an 8-bit code, then one or a plurality of code patterns are used as selected from among "11110000," "11001100" and "10101010." Also, code patterns of "00101101," "11001100" and "10101010" can be used.

If those code patterns are used, then the code patterns can be identified by a correlation matching operation upon reception. As other codes, for example, spread codes including an M sequence, a gold code sequence or the like or orthogonal codes such as, for example, the Hadamard code or the Walsh code may be used. It is to be noted that, where an orthogonal code is used, the identification sensitivity of code patterns can be increased based on a correlation matching operation process upon reception.

[Configuration of the Position Detection Apparatus]

Figure 1:
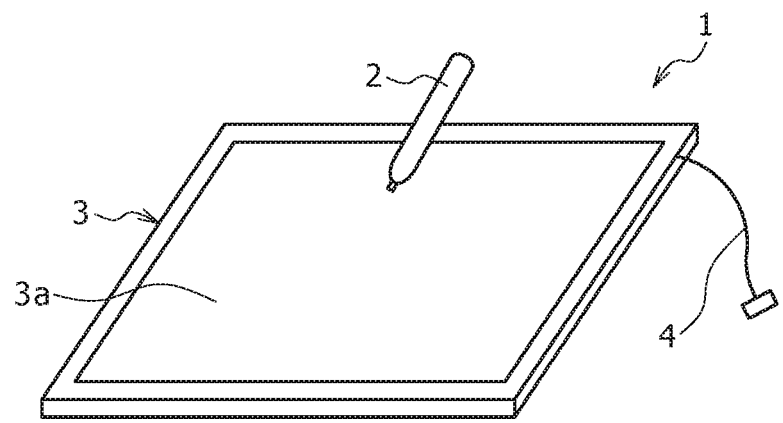
FIG. 1 is a perspective view of a position detection apparatus according to an embodiment of the present invention.

FIG. 1 shows a perspective view of the position detection apparatus of the present embodiment. It is to be noted that, in the present embodiment described below, a tablet is used as the position detection apparatus. The position detection apparatus 1 includes a pointer 2 having a shape of a pen, and a position detector 3 having a shape of a flat plate and being connected to an external apparatus such as a personal computer (PC) through an external apparatus connecting cable 4

The pointer 2 is used on a scannable region 3a of the position detector 3. On the scannable region 3a, a pointed position (coordinate), pressure, and so forth of the pointer 2 can be detected by the position detector 3.

The position detector 3 detects the coordinate of a position pointed to by the pointer 2 and outputs the coordinate information to the external apparatus. Then, on a display screen (not shown) of the external apparatus, a pointer or the like is displayed at a position corresponding to the coordinate information inputted from the position detector 3.

[Configuration of the Pointer]

Figure 2:
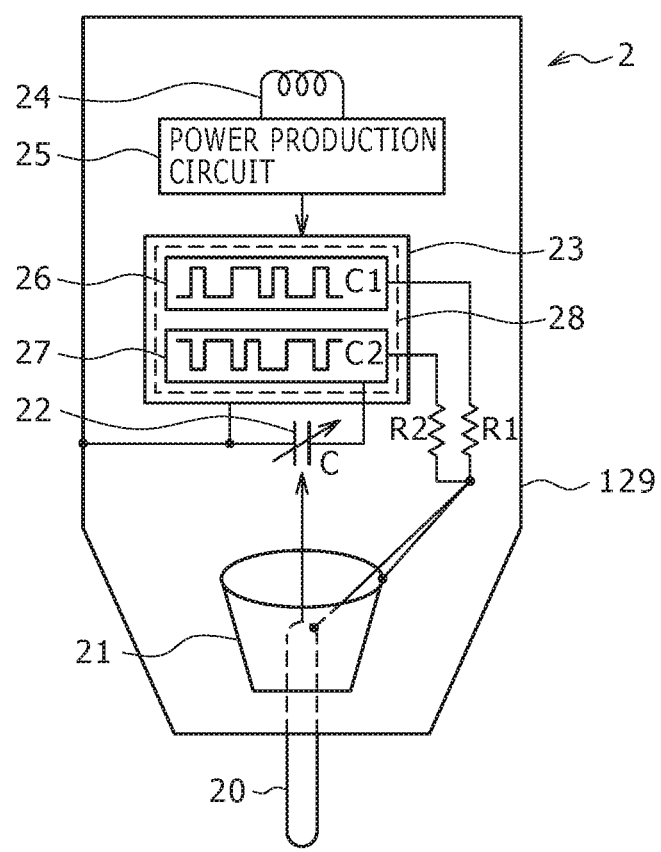
FIG. 2 is a view of a general configuration of a pointer according to an embodiment of the present invention.

FIG. 2 shows a general configuration of the pointer 2 of the present embodiment. The pointer 2 includes a first electrode 20, a second electrode 21, a variable capacitor 22, an integrated circuit 23, a coil 24, a power production circuit 25, and a housing 129 which accommodates the above-mentioned components therein. The variable capacitor 22 is a capacitor that varies its capacitance value in response to a pressure applied thereto. The housing 129 is formed from a material having conductivity such as a metal.

The first electrode 20 has a shape of a rod and is disposed such that one end portion thereof projects from one end portion of the housing 129. Further, the projecting end portion of the first electrode 20 has conductivity and functions as a pen tip. In particular, the end portion projecting from the housing 129 functions as a pen tip of the pointer 2 and functions also as the first electrode 20. Meanwhile, the second electrode 21 is, in the present example, a substantially cylindrical electrode and is disposed in such a manner as to surround the first electrode 20. In particular, the second electrode 21 is disposed along an inner peripheral face of the housing 129 around the first electrode 20 having a shape of a rod. Further, codes (C1 and C2) outputted from the integrated circuit 23 are added together through resistors (R1 and R2) and then supplied to the first electrode 20 and the second electrode 21. Accordingly, the signals outputted from the integrated circuit 23, which respectively correspond to the two code patterns, are applied in a mutually added state to the first electrode 20 and the second electrode 21 so that signals are transmitted to the position detector 3 through the first electrode 20 and the second electrode 21.

The variable capacitor 22 disposed as a pressure detection element has a configuration that the capacitance thereof varies in response to a pressure (so-called "pen pressure") applied to the pen tip. In particular, the variable capacitor 22 is configured such that one of a pair of electrodes (not shown) which form the variable capacitor 22 is engaged with an end portion of the first electrode 20. Therefore, if the pointer 2 is brought into contact with the position detector 3 to press the first electrode 20 on the scannable region 3a, then also the one electrode of the variable capacitor 22 is pressed. Consequently, an electric characteristic between the paired electrodes of the variable capacitor 22 varies to change the capacitance of the capacitor. In other words, the capacitance variation amount of the variable capacitor 22 corresponds to the pressure. It is to be noted that a variable inductance coil configured such that the inductance thereof varies in response to the pressure or a variable resistor configured such that the resistance value thereof varies in response to the pressure may be used as the pressure detection element. Further, a resonance circuit including one of a variable capacitor, a variable inductance coil, and a variable resistor may be used. In short, it is only necessary for the pressure detection element to have a configuration such that pressure (pen pressure) applied to an end portion (pen tip) of the pointer 2 acts upon a production starting timing of a code signal outputted from a transmission code production section 28.

The transmission code production section 28 including a first code production section 26 and a second code production section 27 forms the integrated circuit 23. In the present embodiment, a first code C1 outputted from the first code production section 26 is used to carry out position detection while the first code C1 as well as a second code C2 outputted from the second code production section 27 are used to carry out pressure detection.

Output terminals of the integrated circuit 23 are connected, through resistors (R1 and R2), to the first electrode 20 and the second electrode 21, so as to output a transmission signal corresponding to the first code C1 and/or the second code C2 to the first electrode 20 and the second electrode 21 at a predetermined timing. It is assumed that, in the present embodiment, the first code C1 outputted from the first code production section 26 and the second code C2 outputted from the second code production section 27 have code patterns different from each other. However, the present invention is not limited to this configuration, and the same code pattern may be used to produce two codes by controlling the signal production starting timings of these codes, as hereinafter described.

The second code production section 27 is connected to the variable capacitor 22. Further, the second code production section 27 varies the signal production starting timing of the second code C2 based on a capacitance variation of the variable capacitor 22 according to the pen pressure. In particular, in the present embodiment, the time difference between the production timing of the first code C1 outputted from the first code production section 26 and the production timing of the second code C2 corresponds to the pressure applied to the pointer 2.

The integrated circuit 23 includes a control circuit (not shown) for controlling operation of the transmission code production section 28, and a clock signal and other signals necessary for the control are produced by the control circuit. It is to be noted that the integrated circuit 23 is driven by a voltage produced by the coil 24 and the power production circuit 25 hereinafter described.

The coil 24 receives an excitation signal signaled from an excitation coil 35 of a sensor section 30 hereinafter described provided in the position detector 3. Consequently, a high frequency signal is induced in the coil 24. The induced high frequency signal is inputted to the power production circuit 25. The power production circuit 25 has a rectification circuit not shown and rectifies the high frequency signal supplied from the coil 24 by means of the rectification circuit to convert the high frequency signal into a DC voltage. Then, the power production circuit 25 supplies the DC voltage obtained by the conversion, as driving power for the integrated circuit 23, to the integrated circuit 23.

It is to be noted that, while, in the present embodiment, the first code production section 26 and the second code production section 27 for producing the first code C1 and the second code C2, respectively, are provided in the integrated circuit 23, the present invention is not limited to this configuration. Another configuration may be used wherein, for example, a ROM (Read Only Memory) is provided in the integrated circuit 23 and the first code C1 and the second code C2 are stored in the ROM such that, when transmitting codes, the code patterns are read out from the ROM and transmitted. It is to be noted that, in this instance, a corresponding relationship between the capacitance variation amount $\Delta C$ of the variable capacitor 22 and the signal production starting timing of the first code C1 and the signal production starting timing of the second code C2 is pre-stored as a table in the ROM.

Figure 3A:
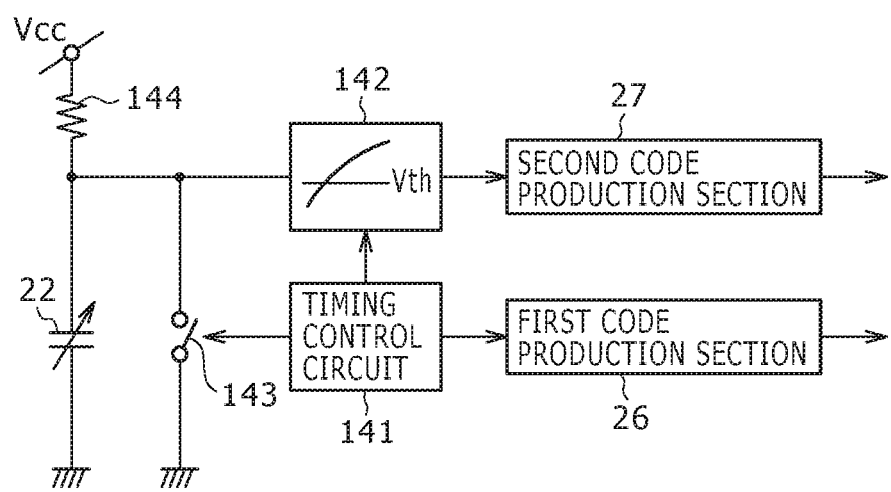
FIGS. 3A and 3B are circuit block diagrams of a transmission code production section in the pointer.
Figure 3B:
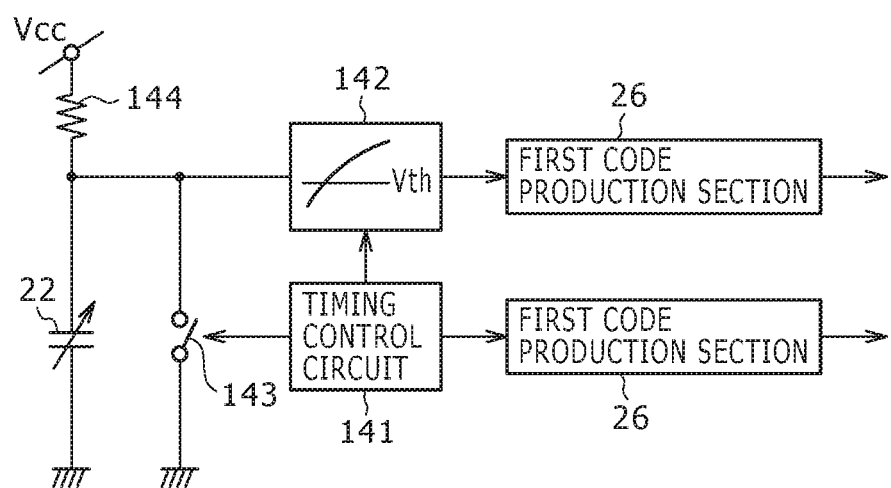

FIGS. 3A and 3B show examples of a circuit configuration of the transmission code production section 28 in the pointer 2 shown in FIG. 2. FIG. 3A shows an example of a circuit configuration of the transmission code production section 28 where the code patterns of the first code C1 and the second code C2 are different from each other. The variable capacitor 22, whose capacitance varies in response to the pressure applied to the first electrode 20, is connected at one terminal thereof to the ground. The variable capacitor 22 is connected at the other terminal thereof to the power production circuit 25 through a resistor 144 such that a predetermined voltage Vcc is supplied thereto.

A timing control circuit 141 carries out ON/OFF control of a switch 143 in a predetermined period t1. In particular, the switch 143 is turned ON once by the timing control circuit 141 to discharge the charge of the variable capacitor 22 and is then turned OFF. Further, while turning the switch 143 OFF, the timing control circuit 141 instructs the first code production section 26 to produce a first code C1. When the switch 143 is OFF, the variable capacitor 22 is gradually charged through the resistor 144. Thereupon, the potential between the opposite terminals of the variable capacitor 22 gradually increases depending upon the capacitance value which varies in response to the pressure.

A delay setting circuit 142 carries out comparison between the potential of the variable capacitor 22 and a predetermined potential Vth in response to supply of a control signal from the timing control circuit 141. If the potential of the variable capacitor 22 reaches the predetermined potential Vth, then the delay setting circuit 142 instructs the second code production section 27 to produce a second code C2. By the configuration described above, the difference between the code production timing of the first code C1 from the first code production section 26 and the code production timing of the second code C2 from the second code production section 27, that is, the time difference between the first code C1 and the second code C2, varies based on the capacitance value which is varied in response to the pressure applied to the pen tip. Thus, the pressure can be detected by detecting the time difference.

FIG. 3B shows an example of a circuit configuration of the transmission code production section 28 where the same pattern is used for the first code C1 and the second code C2. In other words, a circuit configuration where a single code is used is shown. In this example, the first code production section 26 is used in place of the second code production section 27 shown in FIG. 3A, but the configuration of the other part is the same. Where the first code C1 and the second code C2 have the same code pattern as in the present example, the time difference between them varies in response to the pressure, and consequently, the pressure can be detected by detecting the time variation, also.

[Configuration of the Position Detector]

Figure 4:
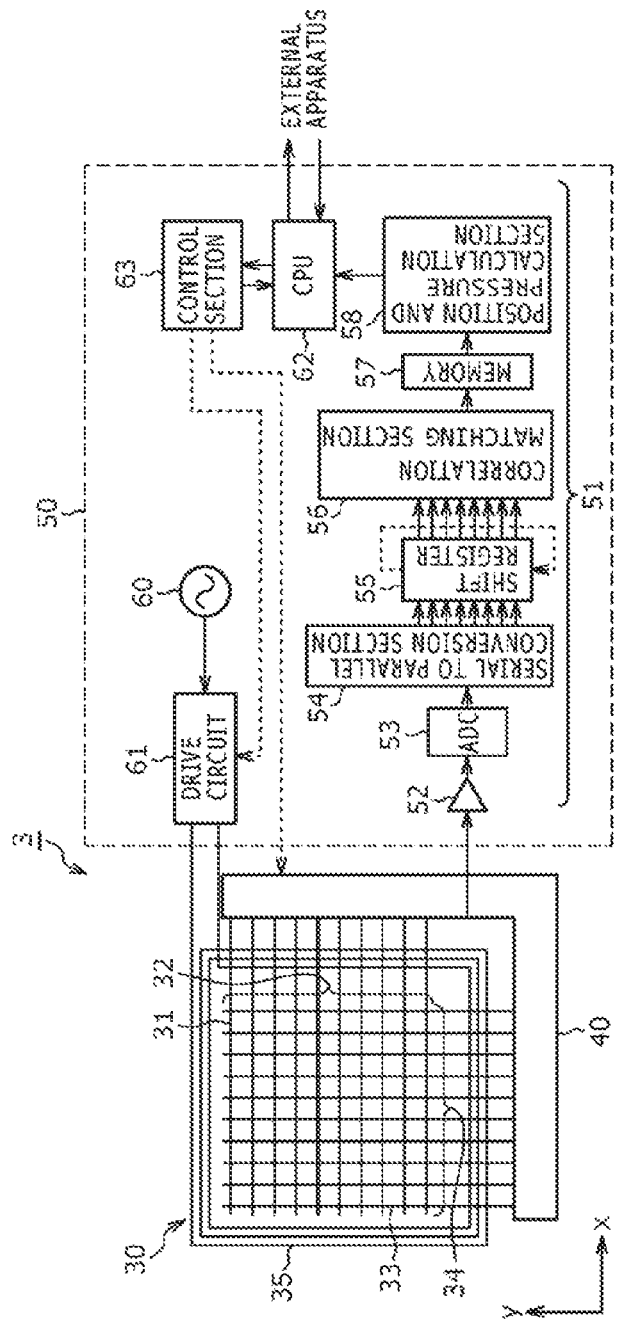
FIG. 4 is a view of a general configuration of a position detector according to an embodiment of the present invention.

FIG. 4 shows a general configuration of the position detector 3. The position detector 3 includes, as principal components thereof, a sensor section 30 for detecting a pointing position of the pointer 2, a selection circuit 40 for selecting a plurality of conductors which form the sensor section 30, and a position detection circuit 50. It is to be noted that, in FIG. 4, a flow of processing of a reception signal is indicated by a solid line arrow mark, and a flow of a control signal, a clock signal or the like is indicated by a broken line arrow mark. It is to be noted, however, that, in FIG. 4, broken line arrow marks indicative of flows of a control signal, a clock signal and so forth of a reception system circuit group 51 are omitted in order to simplify the description.

The sensor section 30 includes a first conductor group 32 including a plurality of first conductors 31 extending in an x direction (predetermined direction) in FIG. 4, a second conductor group 34 including a plurality of second conductors 33 extending in a direction crossing with the extension direction of the first conductors 31, that is, in a y direction in FIG. 4, and the excitation coil 35 provided on an outer periphery of the conductor groups. The plurality of first conductors 31 which form the first conductor group 32 are disposed in a predetermined spaced relationship from each other and in parallel to each other in the y direction in FIG. 4. Meanwhile, the plurality of second conductors 33 which form the second conductor group 34 are disposed in a predetermined spaced relationship from each other and in parallel to each other in the x direction in FIG. 4.

It is to be noted that the first conductors 31 and the second conductors 33 are formed, for example, from a transparent electrode film formed from an ITO (Indium Tin Oxide) film, a copper foil or the like. Further, the first conductor group 32 and the second conductor group 34 are laminated with a spacer, which is made of a resin material or the like or a glass substrate or the like (not shown) interposed therebetween. Further, the conductors of the first conductor group 32 and the second conductor group 34 are connected to the selection circuit 40. The excitation coil 35 is connected to a drive circuit 61 hereinafter described in the position detection circuit 50.

The number and the pitch of the first conductors 31 and the second conductors 33 are set suitably according to the size of the sensor section 30, required detection accuracy and so forth. Further, while, in the present embodiment, a linear conductor is illustrated as the first conductors 31 and the second conductors 33, the present invention is not limited to this configuration. For example, both of the first conductors 31 and the second conductors 33 may meander in directions crossing with the extension directions. Further, one of the first conductors 31 and the second conductors 33 may be formed as ring-shaped conductors and the other conductors may be formed as conductors which extend in radial directions from the center of the ring-shaped conductors.

The selection circuit 40 selects a predetermined conductor from within the first conductor group 32 and the second conductor group 34 in a predetermined order so as to select them in order. The conductor selection control by the selection circuit 40 is controlled by a control signal (broken line arrow mark in FIG. 4) outputted from a control section 63, which cooperates with a central processing unit 62 hereinafter described. It is to be noted that, in the present embodiment, the sensor section 30 at least has a configuration for receiving a predetermined signal transmitted from the pointer 2. Further, in the present embodiment, in order to time-divisionally operate the reception system circuit group 51, a configuration is provided for detecting the position (X coordinate and Y coordinate) pointed to by the pointer 2 by selecting a predetermined conductor from within each of the first conductor group 32 and the second conductor group 34 by means of the selection circuit 40. It is to be noted that, if a configuration which includes a plurality of reception system circuit groups 51 corresponding to the number of conductors which form the sensor section 30 is adopted, then the selection circuit 40 can be omitted.

The position detection circuit 50 includes a reception system circuit group 51, an oscillator 60, a drive circuit 61, a central processing unit 62 (CPU), and a control section 63.

The oscillator 60 outputs an AC signal or a pulse signal of a predetermined frequency to the drive circuit 61. The drive circuit 61 converts the signal inputted thereto from the oscillator 60 into a current and outputs the current to the excitation coil 35.

The control section 63 cooperates with the central processing unit 62 to output control signals (broken line arrow marks in FIG. 4) to the components in the position detection circuit 50 and outputs a result of calculation of a position and pressure calculation section 58 hereinafter described in the reception system circuit group 51 to the external apparatus. Further, the central processing unit 62 includes a software program and controls operation of the control section 63.

The reception system circuit group 51 includes, as principal components thereof, a reception amplifier 52, an A/D (Analog to Digital) conversion circuit 53, a serial to parallel conversion section 54, a shift register 55, a correlation matching section 56, a memory 57, and a position and pressure calculation section 58 (detection section). The reception amplifier 52, A/D conversion circuit 53, serial to parallel conversion section 54, shift register 55, correlation matching section 56, memory 57, and position and pressure calculation section 58 are connected in this order from the selection circuit 40 side.

The reception amplifier 52 amplifies a reception signal inputted from a predetermined conductor selected by the selection circuit 40. Then, the reception amplifier 52 outputs the amplified reception signal to the A/D conversion circuit 53. The A/D conversion circuit 53 carries out analog to digital conversion of the amplified reception signal and outputs a digital signal obtained by the conversion to the serial to parallel conversion section 54.

The serial to parallel conversion section 54 is formed, for example, from a shift register of the serial-input parallel-output type and has a number of stages of flip-flops corresponding to the code length of a code to be used. Operation of the serial to parallel conversion section 54 is controlled by the control section 63 which cooperates with the central processing unit 62 including an execution program. It is to be noted that, for the flip-flops of the individual stages which form the serial to parallel conversion section 54, a flip-flop which can retain information of 1 bit may be used or a flip-flop which can retain information of multi bits (for example, 10 bits or the like) may be used.

The flip-flops of the stages which form the serial to parallel conversion section 54 successively shift a reception signal inputted thereto to the flip-flops at the succeeding stages. Further, an output terminal of each of the flip-flops is connected to an input terminal of a corresponding flip-flop in the shift register 55, hereinafter described which is also formed from multi-stage flip-flops. As a result, a number of output signals equal to the code length of a code to be used are outputted in parallel to the shift register 55.

The shift register 55 is a shift register of the parallel-input and output type and is formed from a number of flip-flops equal to the code length of a code to be used. It is to be noted that, for the flip-flops of the individual stages which form the shift register 55, a flip-flop which can retain information of 1 bit may be used or a flip-flop which can retain information of multi bits (for example, 10 bits or the like) may be used.

Operation of each of the flip-flops in the shift register 55 is controlled by the control section 63 which cooperates with the central processing unit 62. Further, each of the flip-flops which form the shift register 55 cyclically shift a signal inputted thereto to the flip-flops at the succeeding stages while also outputting the signal to corresponding integrators 56d in the correlation matching section 56.

It is to be noted that a register which functions as a buffer for temporarily retaining signals outputted from the serial to parallel conversion section 54 may be provided between the serial to parallel conversion section 54 and the shift register 55. In this instance, while reception signals retained in the shift register 55 are cyclically shifted to calculate a correlation value, signals necessary for next correlation value calculation can be temporarily retained in the register.

The correlation matching section 56 calculates a correlation value between a reception signal outputted from the shift register 55 and a code having a predetermined code pattern (the code is hereinafter referred to as a "correlation calculation code") and outputs a correlation value of the reception signal.

Figure 5:
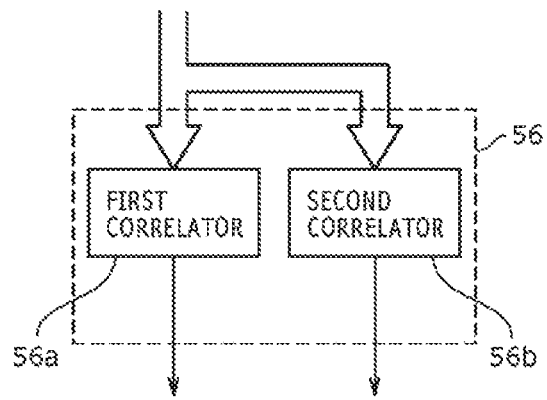
FIG. 5 is a view of a general configuration of a correlation matching section.

FIG. 5 shows a general configuration of the correlation matching section 56, where two codes having different code patterns from each other are transmitted from the pointer 2. The correlation matching section 56 includes two correlators (a first correlator 56a and a second correlator 56b).

The first correlator 56a calculates a correlation value using a correlation calculation code corresponding to a first code C1 outputted from the first code production section 26 of the pointer 2 (first correlation calculation code). In this case, for example, where a PN code which is a representative spread code is used, a correlation calculation code having the same code pattern as that of the first code C1 is used. Meanwhile, the second correlator 56b calculates a correlation value using a correlation calculation code corresponding to a second code C2 outputted from the second code production section 27 of the pointer 2 (second correlation calculation code).

It is to be noted that, where two codes transmitted from the pointer 2 have the same code pattern, the first correlator 56a and the second correlator 56b use the same correlation calculation code. In this instance, a single correlator can be used to carry out the signal processing. Furthermore, where two kinds of codes are used, it is possible to use a configuration which uses one of the codes in a calculation process of a position based on an output signal from the first conductor 31 (Y coordinate) while using the other code in a calculation process of a position based on an output signal from the second conductor 33 (X coordinate) in a position calculation process for determining a position (X coordinate and Y coordinate) pointed to by the pointer 2.

Figure 6:
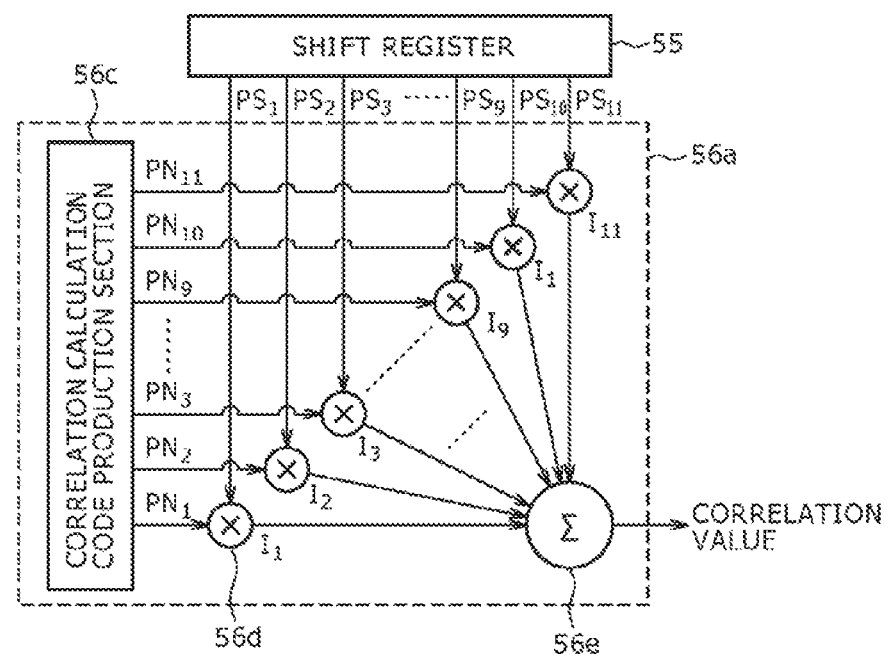
FIG. 6 is a view of a general configuration of a correlator.

FIG. 6 shows a general configuration of the first correlator 56a. It is to be noted that the configuration of the second correlator 56b is similar to the configuration of the first correlator 56a shown in FIG. 6 except that the correlation calculation code to be used is different. Therefore, description of the configuration of the second correlator 56b is omitted.

The first correlator 56a includes a correlation calculation code production section 56c, a number of integrators 56d corresponding to the code length of a correlation calculation code, and an adder 56e. It is to be noted that, in the present embodiment, each of the integrators 56d is connected to an output terminal of a corresponding flip-flop of the shift register 55. Further, in the example shown in FIG. 6, the code length of the correlation calculation code is 11. Therefore, in the example shown in FIG. 6, 11 integrators 56d (integrators $I_1$ to $I_{11}$ in FIG. 6) are provided.

In the example shown in FIG. 6, an example wherein a PN code is used is illustrated, and a reception signal ($PS_1$ to $PS_{11}$) of a code length of 11 outputted from the shift register 55 is inputted to the integrators $I_1$ to $I_{11}$. Further, a correlation calculation code ($PN_1$ to $PN_{11}$) of a code length of 11 outputted from the correlation calculation code production section 56c is inputted to the integrators $I_1$ to $I_{11}$, respectively. The integrators $I_1$ to $I_{11}$ integrate the signal $PS_1$ to $PS_{11}$ outputted from the shift register 55 and the code $PN_1$ to $PN_{11}$ outputted from the correlation calculation code production section 56c, respectively, and output results of the integration to the adder 56e.

The adder 56e adds the output signals from the integrators 56d and outputs the sum value as a correlation value. Thereupon, if a signal string pattern of the reception signal $PS_1$ to $PS_{11}$ outputted from the shift register 55 and a code pattern of the code $PN_1$ to $PN_{11}$ outputted from the correlation calculation code production section 56c coincide with each other, then signals of the same polarity are outputted from all of the integrators 56d and a maximum correlation value is outputted from the adder 56e. In any other case, since the polarities of signals outputted from the integrators 56d are different, a low value indicative of no correlation is outputted from the adder 56e.

It is to be noted that, where the code length of the reception signal retained in the shift register 55 is 11 as in the present example, in the first correlator 56a, the reception signal $PS_1$ to $PS_{11}$ retained in the shift register 55 are cyclically shifted by 10 cycles to verify coincidence with the code pattern of the code $PN_1$ to $PN_{11}$ outputted from the correlation calculation code production section 56c. However, the present invention is not limited to this configuration, and another configuration may be adopted wherein, in place of cyclically shifting the reception signal $PS_1$ to $PS_{11}$ and supplying the cyclically shifted reception signal $PS_1$ to $PS_{11}$ from the shift register 55 to the integrators 56d, the code pattern of the code $PN_1$ to $PN_{11}$ outputted from the correlation calculation code production section 56c is cyclically shifted and then supplied to the integrators 56d.

FIGS. 7A-7C particularly illustrate the operation of the first correlator 56 described above and a calculation principle of a correlation characteristic. It is assumed that a reception signal outputted from the shift register 55 has a time difference corresponding, for example, to an 8-chip length ($8\tau$) relative to the correlation calculation code (refer to FIGS. 7A and 7B).

In this instance, from the start of calculation of a correlation value until time $8\tau$ ($\tau$: unit time for code processing) corresponding to the 8-chip length, the code pattern of the reception signal outputted from the shift register 55 and the code pattern of the correlation calculation code outputted from the correlation calculation code production section 56c are different from each other. Therefore, a low value representative of no correlation is outputted from the first correlator 56a (refer to FIG. 7C). Then, when time $8\tau$ elapses, both code patterns coincide with each other. Thereupon, signals of the same polarity are outputted from all of the integrators 56d as described hereinabove, and the correlation value exhibits the maximum value. Thereafter (after time $8\tau$ has elapsed), since both code patterns become different from each other, the correlation value changes back to the low value. Therefore, if a correlation between the reception signal and the correlation calculation code is determined by the correlator, then a correlation characteristic is obtained wherein the correlation value between the two codes exhibits a peak (singular value) at a point of time when both code patterns satisfy a predetermined time relationship, as seen in FIG. 7C.

In the correlation matching section 56, for each conductor selected for signal detection, a correlation characteristic relative to the first code C1 for position detection is determined by the first correlator 56a and a correlation characteristic relative to the second code C2 for pressure detection is determined by the second correlator 56b, based on the calculation principle of a correlation characteristic (correlation value) described hereinabove. Then, the correlation characteristics are outputted to the memory 57. It is to be noted that, where the code patterns of the first code C1 for position detection and the second code C2 for pressure detection are set the same as each other, it is possible to use a single correlator to determine the correlation characteristics.

Further, the position and pressure calculation section 58 calculates a pointing position (coordinates) and pressure of the pointer 2 from the correlation characteristics calculated based on the signals generated in the conductors and stored in the memory 57. In particular, the position and pressure calculation section 58 detects a peak of a correlation value from the correlation characteristic relative to the first code C1 for position detection to carry out position detection of the pointer 2. In this case, the position detection circuit 50 identifies the pointer 2 which transmits a code pattern corresponding to a code pattern of a correlation calculation code used in the position detection circuit 50 and cooperates with the conductor selection control of the selection circuit 40 to determine the position (X coordinate and Y coordinate) pointed to by the identified pointer 2.

Further, in the present embodiment, the pointer 2 includes a configuration that the time difference between the first code C1 for position detection and the second code C2 for pressure detection varies in response to the pressure, as described hereinabove. In particular, in the present embodiment, the production timing of the second code C2 with respect to the production time of the first code C1 is controlled in response to the pressure, and the second code C2 is transmitted. Therefore, the peak position (time) of the correlation value obtained from the correlation characteristic relative to the second code C2 and the peak position (time) of the correlation value obtained from the correlation characteristic relative to the first code C1 are different according to the pressure. In the present embodiment, the pressure is determined based on the time difference between the peak positions of their respective correlation values. It is to be noted that the calculation principles of the position and the pressure of the pointer 2 are hereinafter described more particularly.

Operation of the Position Detection Apparatus

Figure 9:
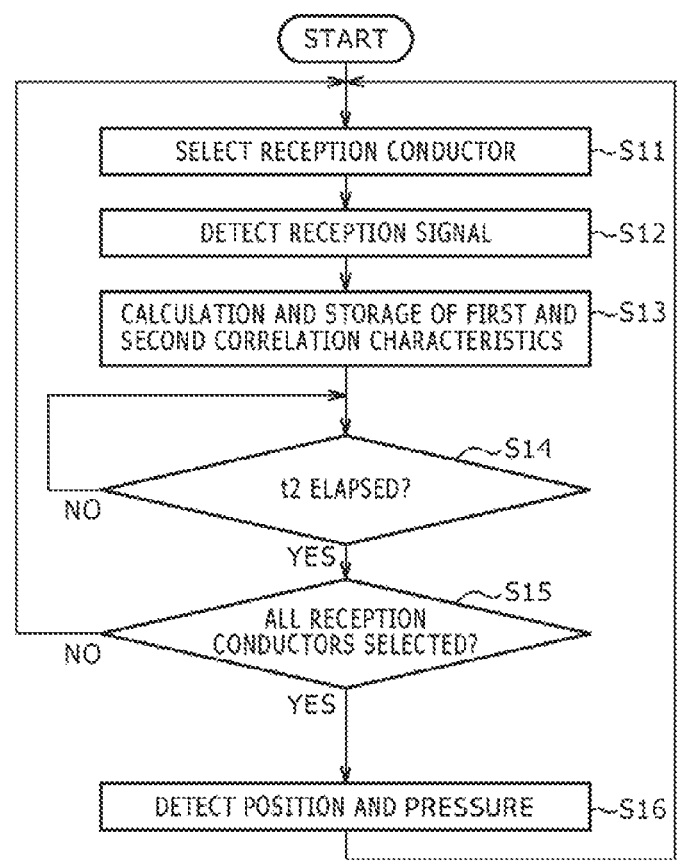
FIG. 9 is a flow chart illustrating an operation procedure of the position detector.

Now, operation of the position detection apparatus 1 of the present embodiment and the principles of position and pressure detection are described with reference to FIGS. 8 to 10. FIG. 8 is a flow chart illustrating operation of the pointer 2 of the present embodiment. FIG. 9 is a flow chart illustrating operation of the position detector 3. Further, FIGS. 10A-10C are views illustrating a transmission operation, a waveform of a reception signal, and a correlation characteristic upon operation of the position detection apparatus 1 of the present embodiment, respectively.

First, operation of the pointer 2 is described with reference to FIG. 8A and FIG. 10. First, the pointer 2 transmits a first code C1 for position detection from the first code production section 26 through the first electrode 20 and the second electrode 21 (step S1). Then, at a point of time at which a time period corresponding to the pressure elapses, the pointer 2 transmits a second code C2 for pressure detection from the second code production section 27 through the first electrode 20 and the second electrode 21 (step S2).

Then, the pointer 2 determines whether or not the processing time after the start of transmission of the first code C1 (step S1) reaches a predetermined time period t1 sufficient to have transmitted a code pattern of the second code C2 (step S3). If the processing time after the start of transmission of the first code C1 does not reach the predetermined time period t1 sufficient to have transmitted the code pattern of the second code C2, that is, if the decision at step S3 is NO, then the pointer 2 waits until the predetermined time period t1 lapses. On the other hand, if the processing time after the start of transmission of the first code C1 exceeds the predetermined time period t1, that is, if the decision at step S3 is YES, then the processing returns to step S1.

In the pointer 2, a series of processes of transmitting a first code C1 and then, after a time period corresponding to the pressure elapses, transmitting a second code C2, as described hereinabove, are executed repetitively. A manner of this operation is illustrated in FIG. 10A. In this example, a first code C1 for determining a position pointed to by a pointer and a second code C2, whose transmission is started at a point of time at which a predetermined time period Td corresponding to the pressure elapses after the transmission starting time of the first code C1, are temporally multiplexed through the first electrode 20 and the second electrode 21 and transmitted from the pointer 2 as illustrated in FIG. 10A.

It is to be noted that, after the transmission of the second code C2 is completed, the transmission of the first code C1 (step S1) is started again after a predetermine time period (t2) has elapsed from the start of transmission of the first code C1.

It is to be noted that it is possible to make the code pattern of the first code C1 and the code pattern of the second code C2 the same as each other, as described hereinabove.

Now, operation of the position detector 3 is described with reference to FIGS. 9 and 10B and 10C. The position detector 3 carries out position and pressure detection of the pointer 2 in the following manner. First, the selection circuit 40 selects a predetermined conductor from within the conductor groups of the sensor section 30 (step S11). Then, the reception system circuit group 51 detects a reception signal (step S12). Then, the reception system circuit group 51 carries out amplification and analog to digital conversion of the reception signal. Then, the correlation matching section 56 is used to calculate a correlation value between a correlation calculation code corresponding to the first code C1 and the reception signal, and a correlation value between a correlation calculation code corresponding to the second code C2 and the reception signal, to determine correlation characteristics (first and second correlation characteristics), respectively, and stores the correlation characteristics in the memory 57 (step S13).

Then, in step S14, the position detector 3 determines whether or not the predetermined time period t2, required for the series of processes after the start of selection of a reception conductor until the detection of the pointing position and the pressure of the pointer 2, has elapsed from the selection process of a reception conductor (step S11). It is to be noted that the predetermined time period t2 is set to a time period longer than the predetermined time period t1 of the pointer 2, described hereinabove.

It is to be noted that, if the predetermined time period t2 has not elapsed after the selection process of a reception conductor (where the decision at step S14 is NO), then the position detector 3 waits until the predetermined time period t2 lapses.

When the predetermined time period t2 lapses, that is, when the decision at step S14 becomes YES, it is determined whether or not all reception conductors have been selected (step S15). If the decision at step S15 is NO, then the processing returns to the reception conductor selection at step S11. On the other hand, if the decision at step S15 is YES, then the position and pressure calculation section 58 in the reception system circuit group 51 calculates the position (coordinates) pointed to by the pointer 2 based on the first correlation characteristic stored in the memory 57, more particularly based on a peak of the correlation value. Further, pressure applied to the pointer 2, so-called pen pressure, is calculated based on the time difference between the first correlation characteristic and the second correlation characteristic, more particularly, the time difference between the two peaks of the correlation values (step S16).

Here, the principles of position and pressure detection of the pointer 2 at step S16 described above are described with reference to FIGS. 10B and 10C. Where the pointer 2 exists on the conductor selected at step S11 described hereinabove, within the predetermined time period t1 for position detection and pressure detection, a signal including the first code C1 and the second code C2 is transmitted from the pointer 2. In the selected reception conductor, a reception signal Sp1 corresponding to the transmission signal is generated (refer to FIG. 10B).

The reception signal Sp1 supplied to the correlation matching section 56 is inputted in parallel to the first correlator 56a and the second correlator 56b. The first correlator 56a uses the correlation calculation code corresponding to the first code C1 to calculate a correlation characteristic p1 between the correlation calculation code and the reception signal Sp1. It is to be noted that, in this example, a PN code is used as the first code C1. Accordingly, as the first correlation calculation code, a PN code which is the same as the first code C1 is used. From the first correlator 56a, a correlation value is outputted, which exhibits a maximum value (peak p1 in FIG. 10C) at a point of time at which the code patterns of the reception signal Sp1 and the correlation calculation code coincide with each other but exhibits a low correlation value at any other time period.

Meanwhile, the second correlator 56b uses the correlation calculation code corresponding to the second code C2 to calculate a correlation characteristic p2 between the correlation calculation code and the reception signal Sp1. Similarly as in the case of the first correlator 56a, since a PN code is used as the second code C2 in this example, a PN code which is the same as the second code C2 is used as the second correlation calculation code. From the second correlator 56b, a correlation value is outputted, which exhibits a maximum value (peak p2 in FIG. 10C) at a point of time at which the code patterns of the reception signal Sp1 and the correlation calculation code coincide with each other but exhibits a low correlation value at any other time period.

It is to be noted that, when a pointer 2 does not exist on the selected conductor, a peak of the correlation value does not appear. Further, the time difference between the peaks p1 and p2 of the two correlation values, that is, the time difference ($\Delta C$ in FIG. 10C), varies corresponding to the pressure. Accordingly, in the correlation characteristic illustrated in FIG. 10C, the position of the pointer 2 can be detected from the peak p1 or the peak p2 of the correlation value. Further, by detecting the time difference $\Delta C$ between the peaks p1 and p2 of the two correlation values, the pressure applied to the pointer 2 can be detected.

Then, in the present embodiment, the position and pressure calculation section 58 determines a peak level of the correlation value of the correlation characteristic p1 to determine whether or not a pointer 2 exists on the selected conductor. Further, the position and pressure calculation section 58 determines the time difference ($\Delta C$) between the peak level of the correlation value of the correlation characteristic p1 and the peak level of the correlation value of the correlation characteristic p2 to determine the pressure applied to the pointer 2, that is, the pen pressure.

As described above, in the present embodiment, by transmitting first and second codes from the pointer 2, position detection of a pointer is carried out based on the first code, and information other than the position information such as, for example, pressure information is detected based on the time difference between the first code and the second code. It is to be noted that the first and second codes may be codes having code patterns different from each other or having the same code pattern as each other.

When the same code pattern is used, the pointer 2 varies the signaling timing of one code with respect to the signaling timing of the other code in response to the pressure. Therefore, in this instance also, by carrying out the correlation matching operation process, two peaks appear in the correlation characteristic, and not only the position of the pointer 2 but also the pressure can be detected. It is to be noted that, where the code patterns of the two codes to be transmitted from the pointer 2 are the same as each other, since it is necessary to provide only one correlator, the configuration of the correlation matching section 56 is further simplified. Further, as the code, it is only necessary for a desired correlation matching operation result to be calculated by the correlation matching operation process, and for example, a PN code (spread code) can be applied.

[Modification 1]

While the embodiment described above is an example wherein two codes (first code C1 and second code C2) transmitted from the pointer 2 are used to determine the position and the pressure of the pointer 2, the present invention is not limited to this configuration. It is possible to use two codes transmitted from a pointer to detect not only the position of the pointer but also, for example, information regarding whether or not the pointer is contacting the sensor section (the information is hereinafter referred to as "pen down" information). In the description of modification 1, an example is described wherein two codes transmitted from a pointer are used to detect the position of the pointer, a state in which the pointer is positioned in the proximity of (but above) the sensor section (hovering state), and another state in which the pointer is in contact with the sensor section (pen down state).

First, a first example is described with reference to FIG. 2. In this first example, the configuration described hereinabove for pressure detection is applied. In particular, whether or not a pressure higher than a predetermined value is applied to a pointer is detected to determine whether the pointer is in a state wherein it is positioned in the proximity of the sensor section (hovering state) or another state wherein it is contacting the sensor section (pen down stage). Also in this first example, it is apparent that two codes transmitted from the pointer may have code patterns different from each other or the same as each other.

Now, a second example is described. FIG. 11 shows a general configuration of a pointer of this second example. It is to be noted that, in FIG. 11, like elements to those of the embodiment (FIG. 2) described hereinabove are denoted by like reference characters. Further, for the first code and the second code, for example, a PN code (spread code) is used.

The pointer 100 of this example includes a first electrode 20 having a shape of a rod, a switch 101 (first switch), an integrated circuit 102, a coil 24, a power production circuit 25, and a housing 129 which accommodates the components mentioned above. The configuration of the pointer 100 except the switch 101 and the integrated circuit 102 are similar to that of the first embodiment described hereinabove, and therefore, the configuration of only the switch 101 and the integrated circuit 102 is described.

The switch 101 is provided between the housing 129 and a changeover switch 103, hereinafter described, within the integrated circuit 102. Further, the switch 101 is engaged with the first electrode 20 and configured such that, when the first electrode 20 functioning as the pen tip is pressed on the scannable region 3a, then the switch 101 is placed into an ON state.

The integrated circuit 102 includes a transmission code production section 28 including a first code production section 26 and a second code production section 27, and a changeover switch 103 (second switch). It is to be noted that the transmission code production section 28 has a configuration similar to that of the embodiment described hereinabove.

The changeover switch 103 is connected at an input terminal thereof to output terminals of the first code production section 26 and the second code production section 27 and at an output terminal thereof to the first electrode 20. The changeover switch 103 selects which one of a first code C1 and a second code C2 should be transmitted. The changeover operation of the changeover switch 103 is controlled by a connection state (ON or OFF state) of the switch 101. In particular, when the switch 101 is in an OFF state (where the pointer 100 is in a hovering state wherein it is afloat above the sensor section), the changeover switch 103 is connected to the second code production section 27, but when the switch 101 is in an ON state (where the pointer 100 is placed in a pen down state wherein it is contacting the sensor section), the changeover switch 103 is connected to the first code production section 26.

In particular, when the pointer 100 is afloat above the sensor section, the second code C2 is transmitted from the pointer 100 to the sensor section. In this instance, the sensor section detects a peak of the correlation value from the reception signal corresponding to the second code C2, to thereby detect that the pointer 100 is in a hovering state and the position of the pointer 100 in the hovering state. On the other hand, when the pointer 100 contacts the sensor section, the first code C1 is transmitted from the pointer 100 to the sensor section. In this instance, the sensor section detects a peak of the correlation value from the reception signal corresponding to the first code C1 to carry out position detection. In this manner, by identifying the type (C1 or C2) of the code transmitted, it can be determined whether the pointer 100 is in a pen down state wherein it is contacting the sensor section or in a hovering state. This can be carried out, for example, by determining from which one of outputs of the first correlator and the second correlator of a correlation matching section in the reception system circuit group a peak of the correlation value is obtained.

It is to be noted that, also in this example, the first code production section 26 and the second code production section 27 are provided in the integrated circuit 102, but the present invention is not limited to this configuration. Another configuration may be used wherein, for example, a ROM is provided in the integrated circuit 102 and the first code C1 and the second code C2 are stored in the ROM such that, when transmitting a spread code, the codes are read out from the ROM and transmitted.

[Modification 2]

In the description of modification 2, examples of a configuration of a pointer are provided, which can detect operational information of a side switch of the pointer, in addition to the position and the pressure of the pointer, using a plurality of codes transmitted from the pointer.

Figure 12A:
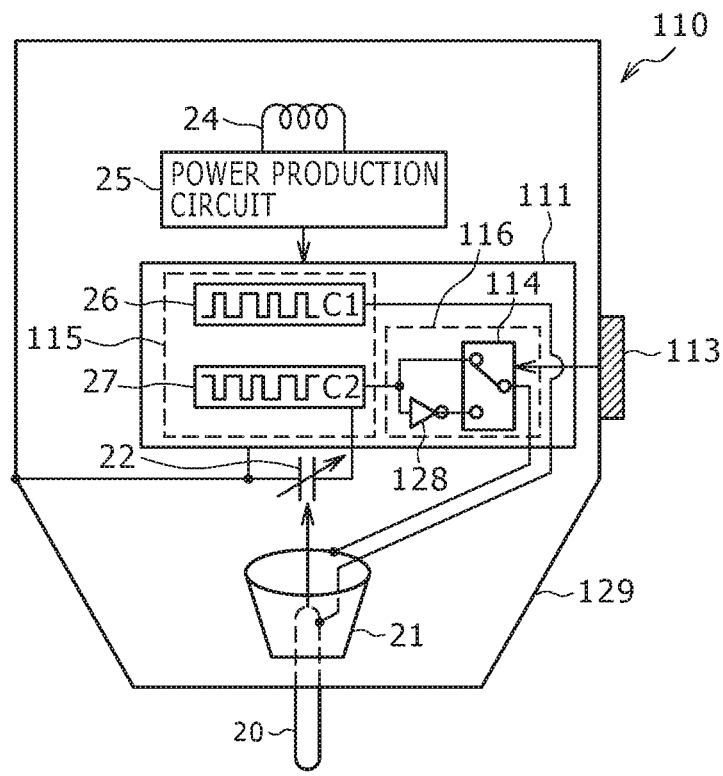
FIGS. 12A and 12B are views of a general configuration of a pointer of modification 2.
Figure 12B:
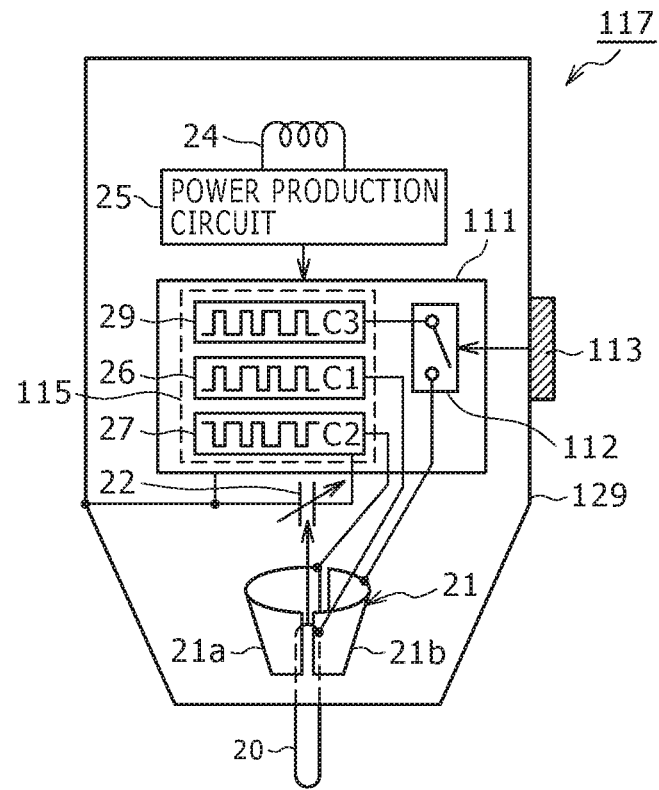

FIGS. 12A and 12B show a general configuration of the pointers of this example. It is to be noted that, in FIGS. 12A and 12B, like elements to those of the embodiment described hereinabove (FIG. 2) are denoted by like reference characters.

The pointer 110 illustrated in FIG. 12A includes a first electrode 20 having a shape of a rod, a cylindrical second electrode 21, a variable capacitor 22, an integrated circuit 111, a coil 24, a power production circuit 25, and a housing 129 which accommodates the components mentioned above. Further, the pointer 110 includes an operation switch provided at a part of a side face of the housing 129, to be operated by a finger or the like, that is, a so-called side switch 113. The configuration of any other part of the pointer 110 than the integrated circuit 111 and the side switch 113 is similar to that of the embodiment described hereinabove, and therefore, the description of only the integrated circuit 111 and the side switch 113 is given.

The integrated circuit 111 includes a transmission code production section 115 including a first code production section 26 and a second code production section 27, a changeover switch 114, and an inverter circuit 128.

The first code production section 26 and the second code production section 27 have a configuration similar to that of the embodiment described hereinabove and produce and output a first code C1 and a second code C2, respectively. Further, as the codes to be produced, a spread code represented by a PN code can be applied. It is to be noted that, the position on the sensor section pointed to by the pointer 110 is detected based on the first code C1 produced by the first code production section 26 as described hereinabove. Meanwhile, detection of pressure applied to the pointer 110, that is, of so-called pen pressure, is carried out by detection of a capacitance variation of a capacitor caused by the first electrode 20 having a shape of a rod pressing the variable capacitor 22 in response to the pressure. In particular, as shown in FIGS. 3A and 3B, the production starting timing of the second code C2 which is produced by the second code production section 27 is varied in accordance with the capacitance of the variable capacitor 22. Accordingly, the pressure can be determined by detecting the time difference between the code production starting timings of the second code C2 and the first code C1 by means of the position detection circuit 50.

Meanwhile, the second code C2 produced by the second code production section 27 is supplied to the changeover switch 114 together with an output inverted signal obtained from the inverter circuit 128, to which the second code C2 is supplied. As the changeover switch 114 is controlled in response to an operation of the operation switch (side switch) 113, the second code C2 produced by the second code production section 27 is supplied to the second electrode 21 through the inverter circuit 128. It is to be noted that the inverter circuit 128 and the changeover switch 114 form a code inversion circuit 116.

According to this configuration, the interposition of the inverter circuit 128 is controlled, which carries out signal inversion of the second code C2 produced by the second code production section 27 in response to an operation of the operation switch (side switch) 113. The position detection circuit 50 can detect whether or not the operation switch (side switch) 113 is operated by detecting whether or not the second code C2 produced by the second code production section 27 is in a signal inverted state based on the processing of the correlation matching section 56. It is to be noted that the operation switch 113 is provided, for example, in order to implement a function of the right click button or the left click button of a mouse used in a personal computer.

In the configuration shown in FIG. 12A, the inverter circuit 128 is provided in the pointer 110, and a signal outputted from the inverter circuit 128 in response to an operation of the operation switch (side switch) 113 is supplied to the second electrode to detect presence or absence of an operation (activation) of the operation switch (side switch) 113. In contrast, in the configuration of a pointer 117 shown in FIG. 12B, the second electrode 21 is formed from a first electrode piece 21a and a second electrode piece 21b. Further, the pointer 117 includes a third code production section 29 in addition to the first code production section 26 and the second code production section 27. It is to be noted that, if a code pattern of a third code C3 produced by the third code production section 29 is made different from code patterns of the first code C1 and the second code C2 produced by the first code production section 26 and the second code production section 27, respectively, then the correlation matching section 56 which forms the position detection circuit 50 can differentiate the codes from one another.

The third code C3 produced by the third code production section 29 is supplied to the second electrode piece 21b through a switch 112, which is switched ON in response to an operation of the operation switch (side switch) 113. By detecting the third code C3 transmitted from the second electrode piece 21b by means of the position detection circuit 50, it can be detected whether or not the operation switch (side switch) 113 is operated. It is to be noted that the second code C2 produced by the second code production section 27 is supplied to the first electrode piece 21a and used for pressure detection. While this example has the configuration wherein the second electrode 21 is divided into two elements including the first electrode piece 21a and the second electrode piece 21b, the present invention is not limited to this configuration, and the second electrode 21 can be divided further finely. The second electrode 21 may be configured such that it is divided into a plurality of electrode pieces disposed substantially cylindrically such that the second code C2 is supplied to the odd-numbered ones of the electrode pieces while the third code C3 is supplied to the even-numbered ones of the electrode pieces. In this instance, a stabile electric coupling characteristic can be assured irrespective of the positional relationship between the sensor section and a peripheral face of the pointer.

It is to be noted that this example may also be configured such that, for example, a ROM is provided in the integrated circuit 111 and the first code C1, second code C2 and third code C3 are stored in advance in the ROM such that, when transmitting codes, the codes are read out from the ROM. Further, as described hereinabove with reference to FIGS. 3A and 3B, the codes including the first code C1, second code C2 and third code C3 may have code patterns different from one another or the same code pattern. However, where the codes have the same code pattern, a predetermined time difference is provided among the codes. Furthermore, while this example has the configuration that the codes are supplied to corresponding ones of the electrodes, it is also possible to supply the codes to the same electrode, for example, by using so-called resistance addition wherein the codes are supplied through resistors or the like.

[Modification 3]

While, in the description of the embodiment and the modifications 1 and 2 described above, codes themselves from the pointer 2 are transmitted directly to the position detector 3, the present invention is not limited to this configuration. Predetermined modulation may be applied to spread codes, and the modulated codes (transmission codes) may be transmitted from the pointer 2 to the position detector 3. In the description of modification 3, a spread code is used as the first and second codes and is PSK (Phase Shift Keying) modulated.

Figure 13A:
FIG. 13A is a waveform diagram of a code, before PSK modulation.
Figure 13B:
FIG. 13B is a signal waveform diagram of the code after the PSK modulation, which forms a signal to be transmitted from a pointer of modification 3.

FIGS. 13A and 13B show waveforms of a spread code before and after PSK modulation. FIG. 13A shows a waveform of a spread code before PSK modulation and FIG. 13B shows a waveform of the spread code after PSK modulation.

In this example, a spread code is PSK modulated with a signal having a clock period that is ½ the code period of the spread code before modulation. It is to be noted that the ratio between the clock period used for modulation and the code period can be suitably adjusted depending on each application. In the PSK modulation of this example, the phase is reversed at a timing of transition of the level of the spread code before modulation (FIG. 13A) from High to Low or from Low to High, to produce a modulated signal (FIG. 13B).

Figure 14:
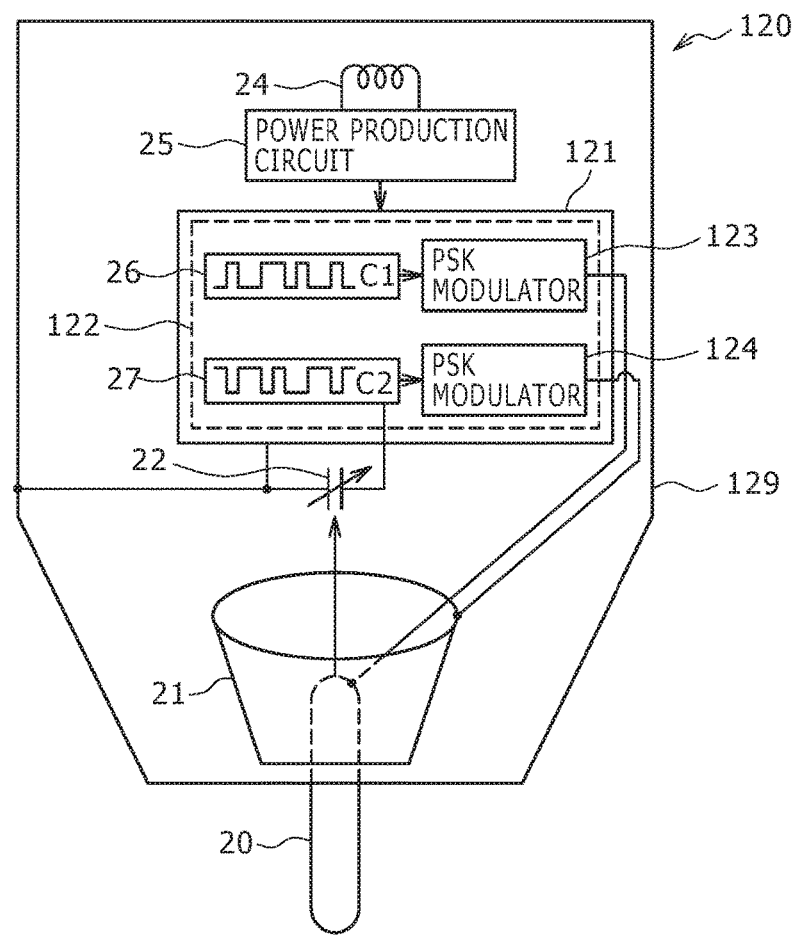
FIG. 14 is a view of a general configuration of a pointer of the modification 3.

FIG. 14 shows a general configuration of a pointer configured to carry out the PSK modulation described above. It is to be noted that, in FIG. 14, like elements to those of the embodiment described hereinabove (FIG. 2) are denoted by like reference characters. The pointer 120 includes a first electrode 20, a second electrode 21, a variable capacitor 22, an integrated circuit 121, a coil 24, a power production circuit 25, and a housing 129 which accommodates the components mentioned above. It is to be noted that the configuration of the pointer 120 other than the integrated circuit 121 is similar to that of the embodiment described hereinabove, and therefore, description is given here only of the integrated circuit 121.

The integrated circuit 121 includes a transmission code production section 122, which in turn includes a first code production section 26, a second code production section 27, and two PSK modulators 123 and 124. The PSK modulator 123 is connected to the output side of the first code production section 26 while the other PSK modulator 124 is connected to the output side of the second code production section 27. The first code production section 26 and the second code production section 27 have a configuration similar to that of the embodiment described hereinabove, and both of the PSK modulators 123 and 124 can be configured from a PSK modulator which is conventionally used in the communication technology field.

It is to be noted that, while, in this example, the first code C1 and the second code C2 are produced in the transmission code production section 122 of the integrated circuit 121 and are PSK modulated, the present invention is not limited to this configuration. It is possible to use another configuration wherein, for example, a ROM is provided in the integrated circuit 121 and the first code C1 and the second code C2, which are PSK modulated in advance, are stored in the ROM such that, when transmitting spread codes, predetermined modulated spread codes are read out from the ROM and transmitted. It is to be noted that, in this instance, a corresponding relationship between capacitance variation amounts of the variable capacitor 22 and variation amounts of the phase of the PSK modulated second code C2 is stored in advance as a table in the ROM.

Figure 15:
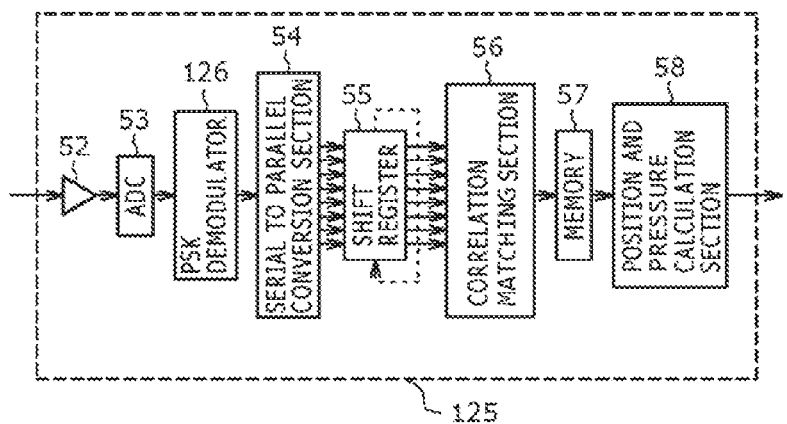
FIG. 15 is a view of a general configuration of a reception system circuit group of a position detector of the modification 3.

Further, since, in this example, a signal supplied to a conductor group is PSK modulated, upon detection of a reception signal, a circuit for demodulating the PSK modulated signal is required. FIG. 15 shows a configuration of the reception system circuit group in the position detector in this example. It is to be noted that, in FIG. 15, like elements to those of the embodiment (FIG. 4) described hereinabove are denoted by like reference characters.

The reception system circuit group 125 includes, as principal components thereof, a reception amplifier 52, an A/D conversion circuit 53, a PSK demodulator 126, a serial to parallel conversion section 54, a shift register 55, a correlation matching section 56, a memory 57, and a position and pressure calculation section 58. The reception amplifier 52, A/D conversion circuit 53, PSK demodulator 126, serial to parallel conversion section 54, shift register 55, correlation matching section 56, memory 57 and position and pressure calculation section 58 are connected in this order from the input side of a reception signal. In particular, in the reception system circuit group 125 of this example, the PSK demodulator 126 is provided between the A/D conversion circuit 53 and the serial to parallel conversion section 54. Except for this, the reception system circuit group 125 has a configuration similar to that of the embodiment described hereinabove. It is to be noted that the PSK demodulator 126 can be formed from a PSK demodulator which is conventionally used in the communication technology field.

If a spread code to be transmitted is PSK modulated as in this example, then since a clock signal of a period shorter than the code period of the spread code is used, the frequency of signal transitions upon rise and fall of spread codes detected by the reception system circuit group 125 can be increased, and errors in position and pressure detection can be reduced. Further, since a spread code is PSK modulated, the frequency range of the transmission signal can be increased and the noise tolerance can be improved.

[Modification 4]

Figure 16A:
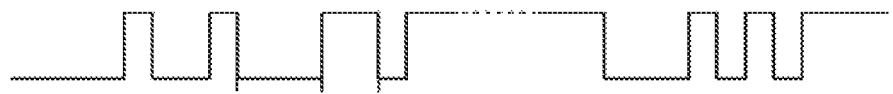
FIG. 16A is a waveform diagram of a code, before FSK modulation.
Figure 16B:
FIG. 16B is a signal waveform diagram of the code after the FSK modulation, which forms a signal to be transmitted from a pointer of modification 4.

In modification 4, a spread code is used as the first and second codes and is FSK (Frequency Shift Keying) modulated. Waveforms of a spread code before and after FSK modulation are shown in FIGS. 16A and 16B, respectively. FIG. 16A shows a waveform of the spread code before FSK modulation and FIG. 16B shows a waveform of the spread code after FSK modulation.

In the present example described below, a spread code is FSK modulated using signals having clock periods equal to ½ and ¼, respectively, the code period of the spread code before modulation. In the FSK modulation of the present example, a High level state of a spread code before modulation (FIG. 16A) is associated with a signal having four times the frequency of that of the spread code before modulation, while a Low level state is associated with a signal having twice the frequency of the spread code before modulation, to thereby obtain a modulated signal (FIG. 16B). It is to be noted that the ratio between the clock period(s) used for modulation and the code period can be suitably adjusted depending on each application.

Figure 17:
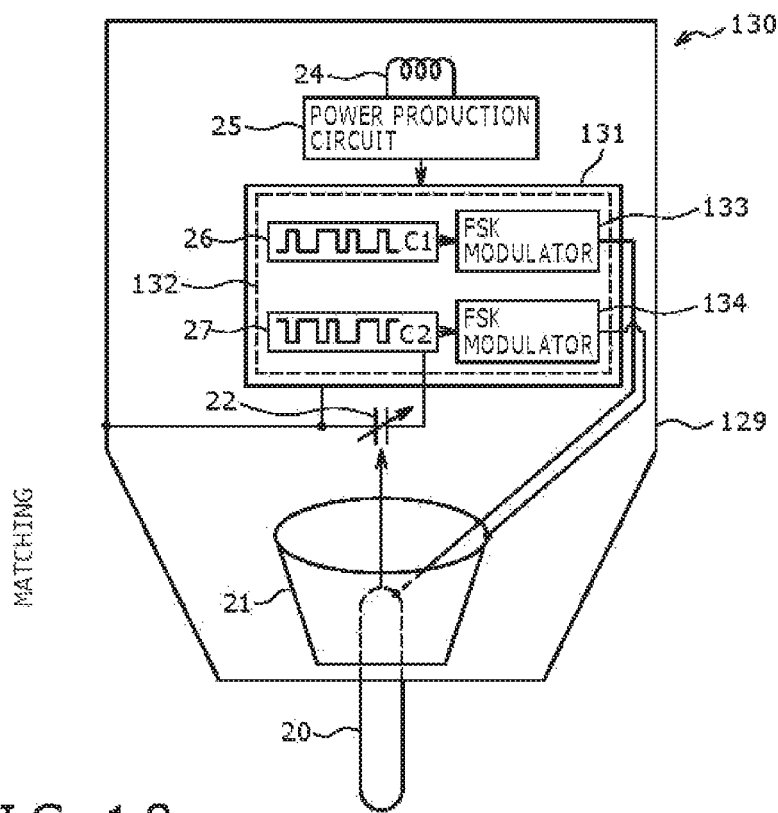
FIG. 17 is a view of a general configuration of a pointer of the modification 4.

FIG. 17 shows a general configuration of a pointer configured to carry out the FSK modulation described above. It is to be noted that, in FIG. 17, like elements to those of the embodiment described hereinabove (FIG. 2) are denoted by like reference characters. The pointer 130 includes a first electrode 20, a second electrode 21, a variable capacitor 22, an integrated circuit 131, a coil 24, a power production circuit 25, and a housing 129 which accommodates the components mentioned above. It is to be noted that the configuration of the pointer 130 other than the integrated circuit 131 is similar to that of the embodiment described hereinabove, and therefore, description is given here only of the integrated circuit 131.

The integrated circuit 131 includes a transmission code production section 132, which in turn includes a first code production section 26, a second code production section 27, and two FSK modulators 133 and 134. The FSK modulator 133 is connected to the output side of the first code production section 26 while the other FSK modulator 134 is connected to the output side of the second code production section 27. The first code production section 26 and the second code production section 27 have a configuration similar to that of the embodiment described hereinabove, and both of the FSK modulators 133 and 134 can be configured from an FSK modulator which is conventionally used in the communication technology field.

It is to be noted that, while, in this example, the first code C1 and the second code C2 are produced in the transmission code production section 132 of the integrated circuit 131 and are FSK modulated, the present invention is not limited to this configuration. It is possible to use another configuration wherein, for example, a ROM is provided in the integrated circuit 131 and the first code C1 and the second code C2, which are FSK modulated, are stored in the ROM such that, when transmitting spread codes, predetermined modulated spread codes are read out from the ROM and transmitted. It is to be noted that, in this instance, a corresponding relationship between capacitance variation amounts of the variable capacitor 22 and variation amounts of the phase of the FSK modulated second code C2 is stored in advance as a table in the ROM.

Figure 18:
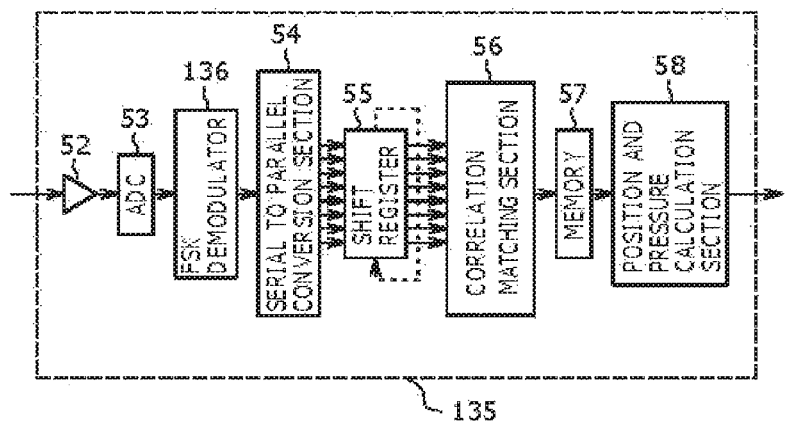
FIG. 18 is a view of a general configuration of a reception system circuit group of a position detector of the modification 4.

Further, since, in this example, a signal supplied to a conductor group is FSK modulated, upon detection of a reception signal, a circuit for demodulating the FSK modulated signal is required. FIG. 18 shows a configuration of the reception system circuit group in the position detector in this example. It is to be noted that, in FIG. 18, like elements to those of the embodiment (FIG. 4) described hereinabove are denoted by like reference characters.

The reception system circuit group 135 includes, as principal components thereof, a reception amplifier 52, an A/D conversion circuit 53, an FSK demodulator 136, a serial to parallel conversion section 54, a shift register 55, a correlation matching section 56, a memory 57, and a position and pressure calculation section 58. The reception amplifier 52, A/D conversion circuit 53, FSK demodulator 136, serial to parallel conversion section 54, shift register 55, correlation matching section 56, memory 57 and position and pressure calculation section 58 are connected in this order from the input side of a reception signal. In particular, in the reception system circuit group 135 of this example, the FSK demodulator 136 is provided between the A/D conversion circuit 53 and the serial to parallel conversion section 54. Except for this, the reception system circuit group 135 has a configuration similar to that of the embodiment described hereinabove. It is to be noted that the FSK demodulator 136 can be formed from an FSK demodulator which is conventionally used in the communication technology field.

If a spread code to be transmitted is FSK modulated as in this example, then since a clock signal of a period shorter than the code period of the spread code is used, the frequency of signal transitions upon rise and fall of spread codes detected by the reception system circuit group 135 can be increased, and errors in position and pressure detection can be reduced. Further, since a spread code is FSK modulated, the frequency range of the transmission signal can be increased and the noise tolerance can be improved.

[Modification 5]

In the modification 2 described with reference to FIGS. 12A and 12B, a configuration is described for assuring a stable electric coupling characteristic between the sensor section and the pointer, irrespective of the positional relationship between the sensor section and a peripheral face of the pointer. In modification 5, a configuration is described for detecting an operational state of a pointer with reference to FIG. 19. More particularly, a configuration is described for detecting the following three operational states.

(1) Detection of a rotational angle r around the pen tip of a pointer 146 as a reference axis.

(2) Detection of the inclination θ of the pointer 146, with its pen tip as a reference point, relative to a plane of the scannable region 3a (the plane formed by the sensor section 30 coupled to the position detection circuit 50).

(3) Detection of the rotational angle φ of the pointer 146 when the pointer 146 is projected to the plane of the scannable region 3a (or a plane parallel to that plane), where the pointer 146 is rotated with its pen tip as a reference point while maintaining the inclination θ, that is, where the pointer 146 is rotated in such a manner as to draw a cone with its pen tip as a reference point while maintaining the inclination θ.

It is to be noted that those elements which have already been described hereinabove are denoted by like reference characters and description of them is omitted. Further, as hereinafter described, information (r, θ, φ) is set with reference to a predetermined electrode piece disposed in the housing of the pointer 146.

Figure 19:
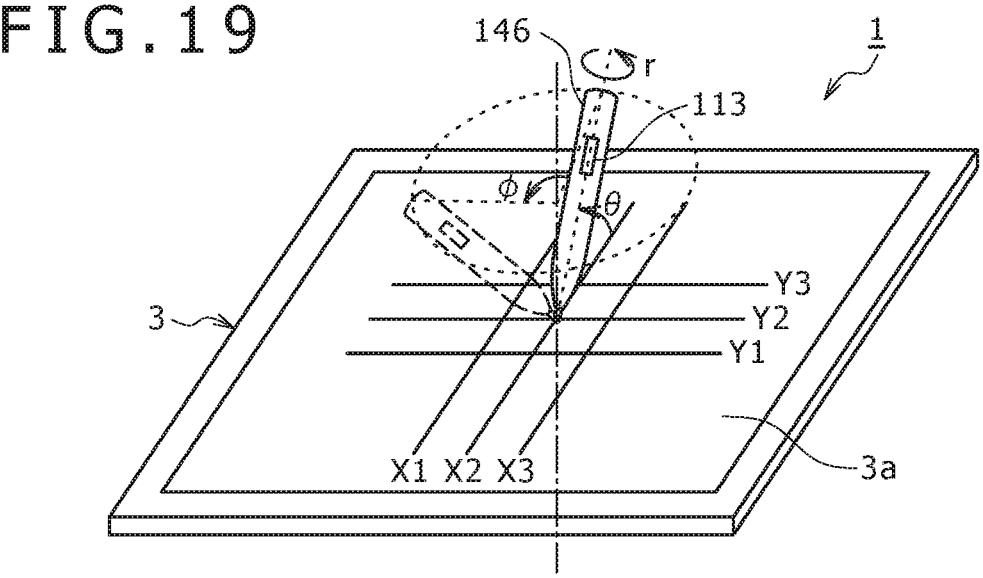
FIG. 19 is a view illustrating rotation detection and inclination detection of a pointer of modification 5

It is assumed that, in FIG. 19, the pointer 146 itself is positioned at a predetermined rotational angle r around the center of rotation provided by the pen tip (axis), which forms the first electrode 20. Further, it is assumed that the pointer 146 points to a position with the inclination θ with respect to the plane of the scannable region 3a of the position detector 3, with its pen tip that forms the first electrode 20 as a reference point. Furthermore, it is assumed that, where the pointer 146 is rotated so as to draw a circle on the plane of the scannable region 3a with its pen tip as a reference point while maintaining the inclination θ, that is, where the pointer 146 is rotated such that a cone having the apex at the pen tip is formed by a locus of movement of the pointer 146, the pointer 146, when projected to the plane of the scannable region 3a (in FIG. 19, a plan parallel to the plane mentioned above), has a rotational angle φ.

Further, a plurality of reception conductors X1, X2, X3, Y1, Y2 and Y3 shown in FIG. 19 are schematically represented to detect the information (r, θ, φ) of the pointer 146. It is to be noted that the reception conductors X1, X2 and X3 correspond to the second conductors 33 which form the second conductor group 34. Meanwhile, the plurality of reception conductors Y1, Y2 and Y3 correspond to the first conductors 31 which form the first conductor group 32. In order to facilitate understanding, it is assumed that the pen tip of the pointer 146 is disposed at a crossing point of the reception conductors X2 and Y2 and the pointer 146 is inclined by the angle θ toward the reception conductor Y3 side along a direction perpendicular to the reception conductors Y1, Y2 and Y3, that is, along a direction in which the reception conductors X1, X2 and X3 extend.

Figure 20:
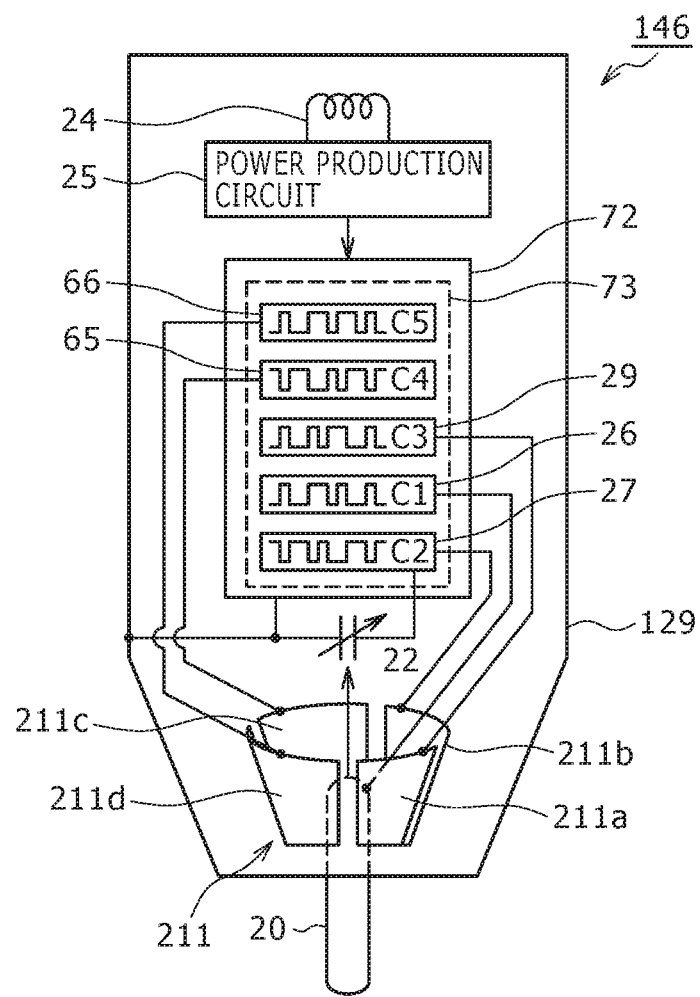
FIG. 20 is a view of a general configuration of a pointer of the modification 5.

In the embodiment shown in FIG. 20, a transmission signal production section 73 of an integrated circuit 72 accommodated in the pointer 146 includes a first code production section 26, a second code production section 27, a third code production section 29, a fourth code production section 65, and a fifth code production section 66, which produce and output a first code C1, a second code C2, a third code C3, a fourth code C4 and a fifth code C5, respectively. It is to be noted that a configuration that the codes have code patterns different from each other such that they can be identified from each other may be adopted or another configuration that the codes are produced with a predetermined time difference given therebetween so that they can be identified on the time axis may be adopted. It is to be noted that, where the codes are produced with a predetermined time difference given therebetween, the codes may be configured such that they have a plurality of code patterns or may be configured such that they have the same code pattern. In short, any configuration may be used as long as the codes can be identified from each other and detected on the side of the position detector 3. In this embodiment, it is assumed that the first code C1, second code C2, third code C3, fourth code C4 and fifth code C5 have code patterns different from one another.

A second electrode 211 is composed of a plurality of electrode pieces (211a, 211b, 211c and 211d) electrically divided from one another and disposed along a circumferential face of the inner side of the housing 129 in the proximity of the pen tip of the pointer 146. A signal of the third code C3 is supplied to the electrode piece 211a; a signal of the second code C2 is supplied to the electrode piece 211b; the fourth code C4 is supplied to the electrode piece 211c; and the fifth code C5 is supplied to the electrode piece 211d. Further, the signal of the first code C1 is supplied to the first electrode 20. When the variable capacitor 22 is pressed by pressure applied to the first electrode 20, the capacitance of the variable capacitor 22 varies, and as a result, the pressure can be detected as described hereinabove. In the present embodiment, the second electrode 211 is composed of a plurality of electrode pieces, and a plurality of codes having different code patterns from one another are respectively supplied to the plurality of electrode pieces. It is to be noted that it is possible to supply a plurality of codes having a time difference from each other and having the same code pattern to the plurality of electrode pieces.

Now, a detection principle of the information (r, θ, φ) is described. Further, in detecting each information, the arrangement position of the electrode piece 211a in the housing of the pointer 146 and a code supplied to the electrode piece 211a are described, as references to the information (r, θ, φ).

First, detection of the rotational angle r (rotational position r) is described. In order to facilitate understanding, it is assumed that the pointer 146 points to a crossing point between the reception conductor X2 and the reception conductor Y2 and the position is pointed to in the vertical direction with respect to the plane of the scannable region 3a. In other words, it is assumed that the inclination θ is 90 degrees. If, in this state, the pointer 146 is rotated along the circumferential face thereof around the pen tip, then the distance, for example, between the reception conductor Y2 and the electrode pieces 211a, 211b, 211c and 211d which form the second electrode 211 varies in response to the rotation of the pointer 146. Consequently, the detection signal level when each code is received through each electrode piece on the reception conductor Y2 varies. Accordingly, by detecting the variation of the signal level of each code, the rotational position r of the pointer 146 can be detected, with reference to the detection signal from the electrode piece 211a.

It is to be noted that, as a reception conductor used when the rotational angle r is detected, it is also possible to use the reception conductor X2 in place of the reception conductor Y2. Further, if the detection signal level of a plurality of codes detected by a plurality of reception conductors (for example, Y1, Y2 and Y3 or X1, X2 and X3) or all reception conductors (for example, X1, X2, X3, Y1, Y2 and Y3) is used, then the rotational position r can be determined more particularly.

Now, detection of the inclination θ of the pointer 146 with respect to the plane of the scannable region 3a with its pen tip as a reference point is described. It is assumed that the pointer 146 is inclined so as to exhibit an inclination θ along the extending direction of the reception conductor X2 in a state wherein the rotational position r is maintained as seen in FIG. 19. In this state, the detection signal level from the reception conductor Y3 is higher than the detection signal level from the reception conductor Y1. Accordingly, the inclination θ of the pointer 146 can be determined by comparing the detection signal levels from a plurality of reception conductors disposed in the proximity of the position pointed to by the pointer 146. It can be readily recognized that, where the pointer 146 is inclined so as to exhibit the inclination θ along the extending direction of the reception conductor Y2, the inclination of the pointer 146 can be detected based on a similar principle.

Further, the rotational angle φ of the pointer 146 obtained by projecting the position of the pointer 146, which is rotated while maintaining the inclination θ with its pen tip as a reference point, to the plane of the scannable region 3a can be detected by developing the detection principle of the inclination θ described above. In particular, the rotational angle φ of the pointer 146 can be detected by comparing the detection signal levels from a plurality of reception conductors, for example, the reception conductors Y1, Y2 and Y3 and/or the reception conductors X1, X2 and X3.

According to such a configuration as shown in FIG. 20, since the distances between the electrode pieces disposed in the housing of the pointer 146 and a predetermined reception conductor are different from each other, as a result, electric coupling relationships between the individual electrode pieces and the reception conductor differ from one another. Accordingly, by comparing the signal levels when the codes (C2, C3, C4 and C5) are detected with respect to a predetermined reception conductor with each other, the information (r, θ, φ) representative of a state of the pointer 146 can be detected.

It is to be noted that, while, in the description of the present embodiment, the detection principle of the information (r, θ, φ) is described using the second electrode 211 composed of four electrode pieces, the number of electrode pieces is not limited to this specific number. Further, as the first code C1 used for detection of the pointing position of the pointer 146, a code having the same code pattern as that of the other codes can be used, as described hereinabove. While, in this embodiment, the plurality of electrode pieces (211a, 211b, 211c and 211d) have a structure such that they are disposed in a circular pattern inside the housing 129 of the pointer 146, it is otherwise possible to use a structure such that they are disposed on an outer peripheral portion of the pointer 146, for example, near the pen tip.

[Modification 6]

In the position detector 3 of the embodiment shown in FIG. 4, a predetermined conductor is selected from within the first conductor group 32 and the second conductor group 34, but the present invention is not limited to this configuration. The selection circuit may be composed of two selection circuits, one of which is used as a selection circuit for selecting a predetermined conductor from within the first conductor group 32 while the other is used as a selection circuit for selecting a predetermined conductor from within the second conductor group 34. Also in this example, a spread code may be used as the first and second codes.

Figure 21:
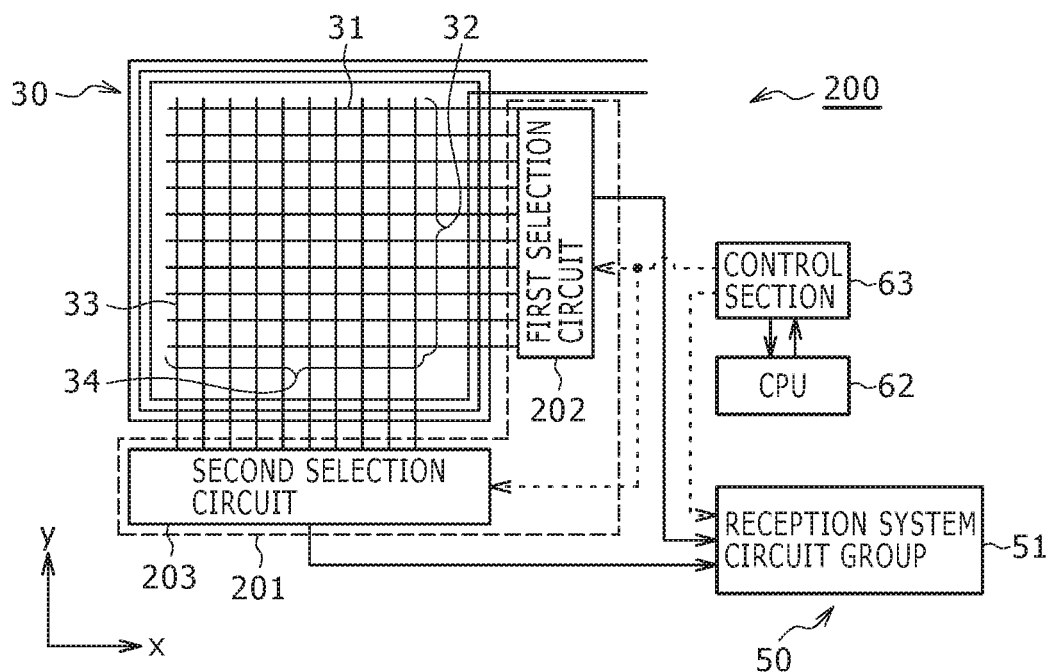
FIG. 21 is a view of a general configuration of a position detector of modification 6.

FIG. 21 shows a general configuration of a position detector of modification 6. It is to be noted that, in FIG. 21, like elements to those of the embodiment (FIG. 4) described hereinabove are denoted by like reference characters. Further, in FIG. 21, only components around a selection circuit 201 are shown to simplify the description.

The selection circuit 201 of the position detector 200 of this example is composed of a first selection circuit 202 for selecting a predetermined one of the first conductors 31 in a predetermined order from within the first conductor group 32, and a second selection circuit 203 for selecting a predetermined one of the second conductors 33 in a predetermined order from within the second conductor group 34. Further, the first selection circuit 202 and the second selection circuit 203 are connected to the reception system circuit group 51. It is to be noted that the configuration of the position detector 200 of the present example other than the selection circuit 201 is similar to that of the embodiment described hereinabove.

In the position detector 200 of the present example, operation of the first selection circuit 202 for selecting a predetermined one of the first conductors 31 from within the first conductor group 32 and operation of the second selection circuit 203 for selecting a predetermined one of the second conductors 33 from within the second conductor group 34 are carried out at the same time. Therefore, in this example, an output signal of the first selection circuit 202 and an output signal of the second selection circuit 203 are inputted to the reception system circuit group 51. In the present example, correlation calculation codes respectively corresponding to the two spread codes C1 and C2 are used to calculate correlation values to carry out position detection and pressure detection of the pointer.

Further, in the configuration of the position detector 200 of the modification 6, the reception system circuit group for processing an output signal of the first selection circuit 202 may be provided separately from the reception system circuit group for processing an output signal of the second selection circuit 203. In this instance, both of the position detection and the pressure detection of the pointer may be carried out by both of the reception system circuit groups, or the position detection and the pressure detection of the pointer may be carried out by one of the reception system circuit groups while only the position detection of the pointer is carried out by the other reception system circuit group. In the former case, high speed detection can be achieved. On the other hand, where the latter is applied, the configuration becomes simpler. It is also possible to select an output signal of the first selection circuit 202 and an output signal of the second selection circuit 203 by means of a changeover (switching) circuit and supply the selected output signals time-divisionally to a common reception system circuit group to carry out the position detection and the pressure detection of the pointer.

[Modification 7]

While, in the description of the embodiment and the modifications 1 to 6 described above, the position detection apparatus is a tablet, the present invention is not limited to this configuration. The position detection apparatus may have not only a function of a tablet but also a function of a touch panel wherein a user touches a screen of a position detector with a finger to carry out a predetermined operation. In the modification 7, the position detection apparatus having both functions of the tablet and the touch panel is described. In this example, a spread code is used as the first and second codes.

Figure 22:
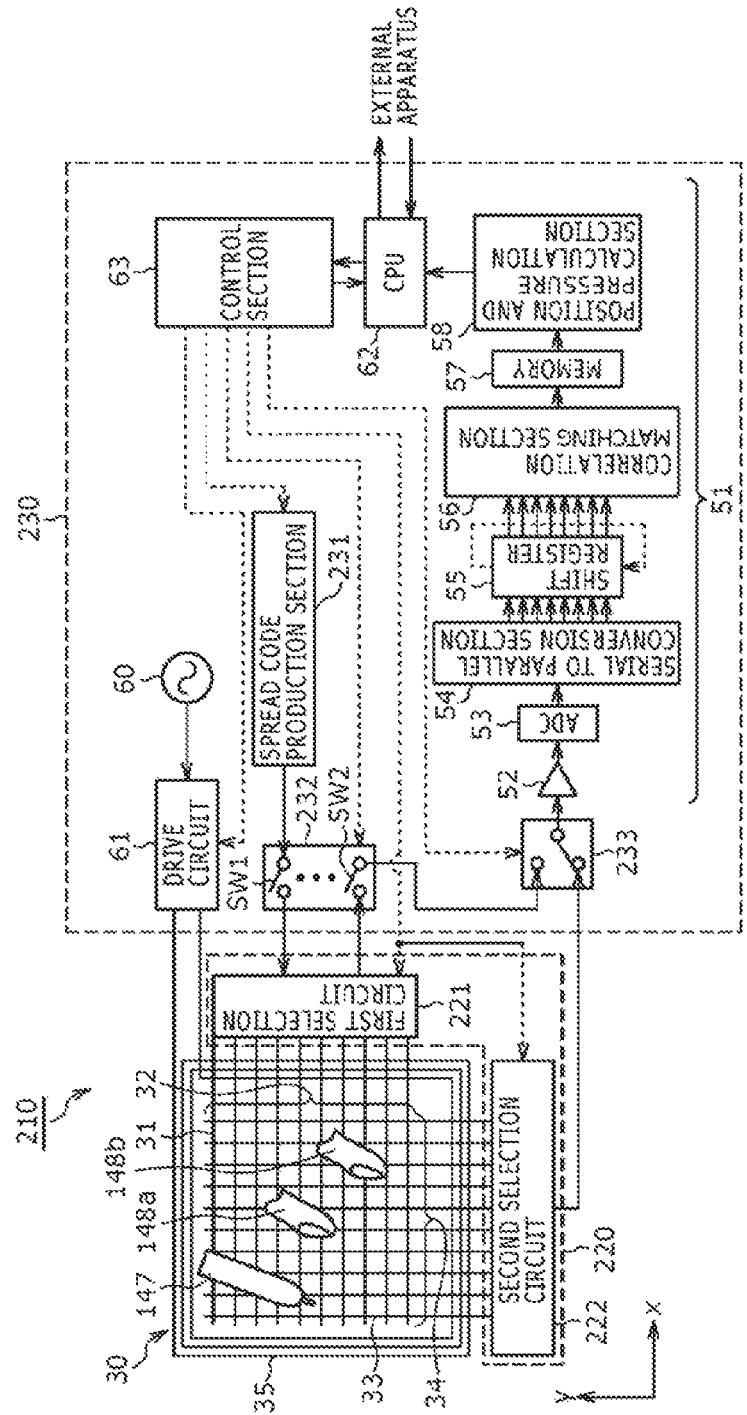
FIG. 22 is a view of a general configuration of a position detector of modification 7.

FIG. 22 shows a general configuration of a position detector of the position detection apparatus of the present example. The position detection apparatus of the present example uses, as the pointer thereof, one of those described in connection with the embodiment and the modifications 1 to 5. Therefore, description is given here only of the configuration of the position detector. It is to be noted that, in FIG. 22, like elements to those of the embodiment shown in FIG. 4 are denoted by like reference characters. Further, in FIG. 22, a flow of processes for a reception signal is indicated by solid line arrow marks, and flows of a control signal, a clock signal and so forth are indicated by broken line arrow marks. However, in FIG. 22, broken line arrow marks indicating flows of a control signal, a clock signal and so forth of the reception system circuit group 51 are omitted to simplify the description.

The position detector 210 of the present example includes, as principal components thereof, a sensor section 30 for detecting pointed positions of a plurality of different types of pointers, such as a pointer 147 having a shape of a pen, a plurality of fingers 148a and 148b and so forth as pointers, a selection circuit 220 for selecting and changing (switching) over a plurality of conductors which form the sensor section 30, and a position detection circuit 230. It is to be noted that, since the sensor section 30 has a configuration similar to that of the embodiment shown in FIG. 4, description of the configuration of the sensor section 30 is omitted.

The selection circuit 220 is composed of a first selection circuit 221 and a second selection circuit 222. The first selection circuit 221 is connected to a first conductor group 32 composed of a plurality of first conductors 31 disposed in parallel in a y direction in FIG. 22 and selects a predetermined one of the first conductors 31 in a predetermined order from within the first conductor group 32. Meanwhile, the second selection circuit 222 is connected to a second conductor group 34 composed of second conductors 33 disposed in parallel in an x direction in FIG. 22 and selects a predetermined one of the second conductors 33 in a predetermined order from within the second conductor group 34. It is to be noted that the changeover (switching) control of the first selection circuit 221 and the second selection circuit 222 is controlled by a control signal outputted from the control section 63 which cooperates with the central processing unit 62.

The position detection circuit 230 includes a reception system circuit group 51, an oscillator 60, a drive circuit 61, a central processing unit 62, a control section 63, a spread code production section 231 (code supplying section), a first changeover (switch) section 232, and a second changeover (switch) section 233. The position detection circuit 230 of the present example is configured such that it includes, in addition to the components of the position detection circuit 50 of the embodiment (FIG. 4) described hereinabove, the spread code production section 231, first changeover section 232 and second changeover section 233. The configuration of the other part of the position detection circuit 230 than the spread code production section 231, first changeover section 232 and second changeover section 233 is similar to that of the embodiment described hereinabove.

Where the position detector 210 is to operate as a touch panel which accepts an operation by a finger, the spread code production section 231 supplies a spread code to a predetermined one of the first conductors 31 of the first conductor group 32. It is to be noted that the spread code production section 231 preferably produces a signal having a third spread code C3 different from a signal of the first code C1 or a signal of the second code C2 transmitted from the pointer 147 having a shape of a pen. However, the present invention is not limited to this configuration, and it is only necessary for the spread code production section 231 to produce a predetermined code, which enables recognition of multiple pen operations simultaneously, that is, recognition of the type of a pointer such as a finger or a pen. When the position detector 210 operates as a touch panel, at a position at which a finger of a user contacts the position detector 210, since a current is shunted to the ground, for example, through the finger, or a movement of the current between conductors crossing with each other occurs, the level of a reception signal obtained through the crossing point of the conductors at the touched position varies. Therefore, by detecting this level variation by means of the reception system circuit group 51, the touched position can be detected two-dimensionally.

The first changeover section 232 carries out changeover between a flow of signals when the position detector 210 is to operate as a tablet for accepting a pen operation, and a flow of signals when the position detector 210 is to operate as a touch panel which accepts an operation of a finger. In particular, when the position detector 210 is to operate as a tablet, since the first conductor group 32 acts as reception conductors, an output terminal of the first selection circuit 221 is connected to an input terminal of the second changeover section 233 through a switch SW2 of the first changeover section 232. At this time, a switch SW1 of the first changeover section 232 places the spread code production section 231 and the first selection circuit 221 into a mutually disconnected state. On the other hand, when the position detector 210 is to operate as a touch panel, since the first conductor group 32 acts as a transmission medium, the output terminal of the spread code production section 231 is connected to the first selection circuit 221 through the switch SW1 of the first changeover section 232. At this time, the switch SW2 of the first changeover section 232 places the first selection circuit 221 and the second changeover section 233 into a mutually disconnected state. It is to be noted that the changeover operation of the first changeover section 232 is controlled by a control signal (broken line arrow mark in FIG. 22) outputted from the control section 63 which cooperates with the central processing unit 62.

When the position detector 210 is to operate as a touch panel for accepting an operation of a finger, the second changeover section 233 connects the second selection circuit 222 and the reception amplifier 52 to each other in an interlocking relationship with the connection between the spread code production section 231 and the first selection circuit 221 through the first changeover section 232 under the control of the control section 63 which cooperates with the central processing unit 62. Where the first changeover section 232 and the second changeover section 233 are controlled in this manner, a transmission signal produced by the spread code production section 231 is successively supplied to the first conductors 31 which form the first conductor group 32 through the first selection circuit 221 while the second conductors 33 which form the second conductor group 34 are successively selected by the second selection circuit 222 and connected to the reception amplifier 52. By this configuration, an operation by a user can be detected two-dimensionally.

On the other hand, when the position detector 210 is to operate as a tablet for accepting an operation of a pen, the second changeover section 233 connects the first selection circuit 221 connected through the first changeover section 232 and the second selection circuit 222 alternately to the reception amplifier 52, under the control of the control section 63 which cooperates with the central processing unit 62. Since the first changeover section 232 and the second changeover section 233 are controlled in this manner, the pointed position by an operation of a pen can be detected two-dimensionally.

Next, an example of operation of a function as a touch panel and a function as a tablet of the position detector 210 of the present example is described briefly. In an example illustrated in FIG. 23, operation as a touch panel and operation as a tablet are switched after every predetermined interval of time. In particular, the first changeover section 232 and the second changeover section 233 are changed over in an interlocked relationship with each other after every predetermined period of time under the control of the control section 63, which cooperates with the central processing unit 62, to detect presence of pointers such as a finger and a pen or positions pointed to by the pointers. In the present example, a position detection operation (tablet function) of the pointer 147 having a shape of a pen and a detection operation (touch panel function) of the touched positions by the fingers 148*a* and 148*b* are repeated alternately after every predetermined period of time (in the example of FIG. 23, for example, 10 ms).

Figure 23:
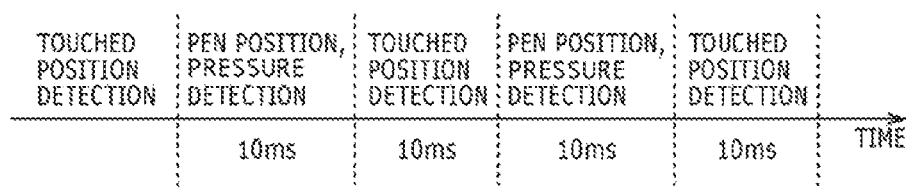
FIG. 23 is a view illustrating operation of the position detector of the modification 7.

It is to be noted that the operation of the position detector 210 of the present example is not limited to the time divisional operation illustrated in the example of FIG. 23. For example, it is also possible to detect presence of a plurality of kinds of pointers represented by a finger and a pen on the sensor section 30 at the same time. In this instance, the position detector 210 operates in the following manner. It is to be noted that, in the following example of an operation, a transmission signal which includes a first spread code and a second spread code, which is different from the first spread code, is transmitted from a pen, and a transmission signal which includes a third spread code different from both the first and second spread codes allocated to the pen is produced by and outputted from the spread code production section 231 shown in FIG. 22.

First, the spread code production section 231 produces a transmission signal including the third spread code and repetitively supplies the transmission signal in a predetermined order to a plurality of first conductors 31, which form the first conductor group 32, through the switch SW1 of the first changeover section 232 and the first selection circuit 221. Thereupon, to the reception amplifier 52 which composes the reception system circuit group 51, the selected conductor is connected through the second selection circuit 222 and the second changeover section 233. It is to be noted that the second selection circuit 222 selects a predetermined conductor from among the plurality of second conductors 33, which form the second conductor group 3,4 by a selection operation in accordance with a predetermined order.

Then, the A/D conversion circuit 53 converts an analog signal outputted from the reception amplifier 52 into a digital signal whose one word is formed from a predetermined number of bits. Then, the serial to parallel conversion section 54 and the shift register 55 carry out serial to parallel conversion of the digital signal into a word having a word length corresponding to the code length of a spread code (C1, C2 and C3), and supplies the signal obtained by the conversion to the correlation matching section 56.

Then, the correlation matching section 56 carries out a correlation matching operation between the digital signal supplied thereto and individual correlation calculation codes. By this configuration, presence or absence of the first, second and third spread codes (C1, C2 and C3) is detected and also their signal levels are detected.

In particular, the operation described above is the same operation for detecting the detection operation of a touched position (touch panel function). Accordingly, the detection operation of the finger position in this operation state is such as described hereinabove. In this operation state, if the pen is operated, then by detecting a spread code of at least one of the first code C1 and the second code C2 transmitted from the pen by means of the correlation matching section 56, presence of the pen or the pointing position of the pen can be recognized. Then, by switching to the function of the position detector 210 as a tablet based on the recognition of the presence or absence of a pen operation, the pen position can be detected two-dimensionally.

On the other hand, if two kinds of pointers including a finger and a pen are detected at the same time by the position detection circuit 230, then by switching the function of the position detector 210 time-divisionally between the touch panel function and the tablet function as illustrated in FIG. 23, it is possible to create a state wherein operations of a finger and a pen appear to be detected at the same time. It is also possible to switch the function setting such that, where a pen and a finger are detected at the same time, the position detector enters the mode for detecting one of the pen and the finger (touch panel function or tablet function).

Further, in the present example, when the position detector 210 is to operate as a touch panel, a plurality of spread codes having phases different from each other may be supplied to corresponding ones of the plurality of first conductors 31 at the same time such that the plurality of spread codes are transmitted by phase multiplex transmission. For example, where the number of first conductors 31 is n, n spread codes having different phases from one another are produced from a spread code of one code pattern by the spread code production section 231 and are supplied in a corresponding relationship to the first conductors 31. Or, spread codes of n code patterns different from one another may be produced and supplied in a corresponding relationship to the n first conductors 31.

In this instance, the reception system circuit group 51 may adopt a configuration which includes correlation calculation codes corresponding to the spread codes produced by the spread code production section 231, and correlation matching operations with the individual received spread codes are carried out simultaneously. It is to be noted that, in this configuration, at least one of the first selection circuit 221 and the second selection circuit 222 which form the selection circuit 220 is not necessarily required.

Further, the position detector 210 of the present example includes a configuration for carrying out time-divisional switching between a touch panel function for detecting a finger as a pointer and a pen tablet function for detecting a pen as a different type of pointer. However, regardless of which function is performed by the position detector 210, the second conductors 33 which form the second conductor group 34 are always used for signal reception. Accordingly, as described hereinabove, where the reception system circuit group 51 includes a circuit configuration which can simultaneously detect a transmission signal supplied from the spread code production section 231 used to detect a finger as a pointer, and a transmission signal supplied from a pen as a pointer of a different type, when the finger position in the x direction is determined, the pen position in the x direction can also be determined simultaneously. Therefore, as a next process for determining the pen position, since the pen position in the x direction is acquired already, it is necessary to determine only the pen position in the y direction. Accordingly, since the position detector 210 of the present example has such a circuit configuration as described above, simultaneous detection of a pen and a finger by the sensor section 30 can be carried out at a high speed.

Furthermore, regarding detection of the presence or absence of an operation of the side switch 113 shown in FIG. 12 (modification 2), by providing a configuration for supplying an operational signal from the side switch 113 to the delay setting circuit 142 of FIG. 3 and switching the potential Vth, it can be detected that the side switch 113 is operated. For example, the potential Vth which is set by the delay setting circuit 142 in response to the fact that the side switch 113 is operated is switched, for example, to a high potential. If the potential Vth is set to the high potential, then even if the pressing force by the pointer is the same, a signal outputted from the delay setting circuit 12 is outputted after it is further delayed by a predetermined period of time. By this configuration, the production timing of a signal to be outputted from the second code production section with respect to a signal outputted from the first code production section is controlled in accordance with the operation of the side switch 113, and as a result, the presence or absence of an operation of the side switch 113 can be detected.

Further, while the pointer 2 shown in FIG. 2, the pointers 110 and 117 shown in FIGS. 12A and 12B, the pointer 120 shown in FIG. 14, the pointer 130 shown in FIG. 17 and so forth have a configuration that a signal outputted from the first code production section 26, second code production section 27 or third code production section 29 is supplied to a corresponding one of the first electrode 20 and the second electrode 21, the supplying configuration is not limited to this specific configuration. In particular, the signals can be added through resistors or the like and supplied to the first electrode 20 or the second electrode 21. According to this configuration, the signal supplying points to the first electrode 20 or the second electrode 21 can be reduced, and the configuration as a pointer can be simplified.

While, in the description of the embodiment and the modifications 1 to 7 described above, an excitation signal is received from an excitation coil of the sensor section to produce a driving voltage for the integrated circuit in the pointer, the present invention is not limited to this configuration, and a power supply such as, for example, a dry cell may be provided inside the pointer.

The invention claimed is:

1. A pen-shaped position indicator configured to capacitively couple with a sensor surface, the pen-shaped position indicator comprising:
   a pen-shaped body having a pen-tip portion; and
   at least three electrodes arranged at the pen-tip portion for transmitting signals, wherein one of the at least three electrodes is arranged on an axis of the pen-tip portion and another one of the at least three electrodes is arranged off the axis of the pen-tip portion;
   wherein the at least three electrodes transmitting signals form capacitive relationships with a sensor surface, respectively, to generate detection signals in the sensor surface from which a first detection signal, a second detection signal, and a third detection signal distinguishable from each other are extracted and used to obtain angular information of the pen-shaped position indicator.

2. The pen-shaped position indicator according to claim 1, wherein at least two of the at least three electrodes are arranged off the axis of the pen-tip portion to surround the one electrode arranged on the axis of the pen-tip portion.

3. The pen-shaped position indicator according to claim 1, wherein at least two of the at least three electrodes are arranged to surround the one electrode arranged on the axis of the pen-tip portion.

4. The pen-shaped position indicator according to claim 1, wherein the pen-tip portion includes conductive material and forms the one electrode arranged on the axis of the pen-tip portion.

5. The pen-shaped position indicator according to claim 1, wherein the signals transmitted from the at least three electrodes are distinguishable from each other.

6. The pen-shaped position indicator according to claim 5, wherein the signals are different in signal-type from each other.

7. The pen-shaped position indicator according to claim 5, wherein the signals are of the same signal-type but have a time difference from each other.

8. The pen-shaped position indicator according to claim 1, wherein the signals are transmitted from the at least three electrodes simultaneously.

9. A method of detecting angular information of a pen-shaped position indicator including a pen-shaped body having a pen-tip portion and at least three electrodes arranged at the pen-tip portion, the method comprising:
transmitting signals from the at least three electrodes, wherein one of the at least three electrodes is arranged on an axis of the pen-tip portion and another one of the at least three electrodes is arranged off the axis of the pen-tip portion,
forming capacitive relationships between a sensor surface and the at least three electrodes transmitting the signals, respectively, to generate detection signals in the sensor surface, from which a first detection signal, a second detection signal, and a third detection signal distinguishable from each other are extracted, and
using the first detection signal, the second detection signal, and the third detection signal to obtain angular information of the pen-shaped position indicator.

10. The method according to claim 9, wherein at least two of the at least three electrodes are arranged off the axis of the pen-tip portion to surround the one electrode arranged on the axis of the pen-tip portion.

11. The method according to claim 9, wherein at least two of the at least three electrodes are arranged to surround the one electrode arranged on the axis of the pen-tip portion.

12. The method according to claim 9, wherein the signals transmitted from the at least three electrodes are distinguishable from each other.

13. The method according to claim 12, wherein the signals are different in signal-type from each other.

14. The method according to claim 12, wherein the signals are of the same signal-type but have a time difference from each other.

15. The method according to claim 9, wherein the signals are transmitted from the at least three electrodes simultaneously.

16. A pen-shaped position indicator configured to capacitively couple with a sensor surface, the pen-shaped position indicator comprising:
a pen-shaped body having a pen-tip portion; and
at least three electrodes arranged at the pen-tip portion for transmitting signals, wherein one of the at least three electrodes is arranged on an axis of the pen-tip portion and another one of the at least three electrodes is arranged off the axis of the pen-tip portion;
wherein the at least three electrodes transmitting signals form capacitive relationships with a sensor surface, respectively, to generate detection signals in the sensor surface, from which a first detection signal, a second detection signal, and a third detection signal distinguishable from each other are extracted, and relative positions of the first, second, and third detection signals are used to obtain angular information of the pen-shaped position indicator.

17. The pen-shaped position indicator according to claim 16, wherein the angular information is one or more of a first rotational angle of the pen-shaped position indicator about its axis, an inclination angle of the pen-shaped position indicator relative to the sensor surface, and a second rotational angle of the pen-shaped position indicator relative to the sensor surface.

18. The pen-shaped position indicator according to claim 16, wherein the detection signals are sensed at least at two different positions in the sensor surface.

19. The pen-shaped position indicator according to claim 18, wherein the detection signals of the at least three electrodes are sensed at at least three different positions in the sensor surface, respectively.

20. The pen-shaped position indicator according to claim 16, wherein the at least three electrodes transmit signals that are distinguishable from each other.

21. A signal processing device, used with a pen-shaped position indicator having a pen-tip portion and at least a first electrode arranged at a first position of the pen-tip portion and a second electrode arranged at a second position of the pen-tip portion different from the first position in a longitudinal direction, wherein the first electrode and the second electrode form capacitive relationships with a sensor array coupled to the signal processing device, the sensor array forming a sensor surface and including first electrodes extending in a first direction and second electrodes extending in a second direction different from the first direction, the signal processing device configured to:
detect a first position pointed to by the pen-shaped position indicator on the sensor surface based on a first capacitive relationship between the first electrode of the pen-shaped position indicator from which a first transmission signal is transmitted and the first and second electrodes of the sensor array,
sense signal levels of signals, based on a second capacitive relationship between the second electrode of the pen-shaped position indicator from which a second transmission signal is transmitted and the first and second electrodes of the sensor array that are located adjacent to the first position, and
determine a tilt angle of the pen-shaped position indicator against the sensor surface of the sensor array based on the first position and comparison of the signal levels of the signals sensed from the first and second electrodes of the sensor array that are located adjacent to the first position.

22. The signal processing device according to claim 21, which is capable of distinguishing the first transmission signal from the first electrode from the second transmission signal from the second electrode of the pen-shaped position indicator.

23. The signal processing device according to claim 22, wherein the first transmission signal from the first electrode and the second transmission signal from the second electrode are different in signal-type from each other.

24. The signal processing device according to claim 22, wherein the first transmission signal from the first electrode and the second transmission signal from the second electrode are of the same signal-type but have a time difference from each other.

25. The signal processing device according to claim 22, wherein the first transmission signal and the second transmission signal are simultaneously transmitted from the first electrode and the second electrode, respectively.

26. A signal processing device, used with a pen-shaped position indicator having a pen-tip portion and at least a first electrode arranged at a first position of the pen-tip portion and a second electrode arranged at a second position of the pen-tip portion different from the first position in a longitudinal direction, wherein the second electrode is off an axis of the pen-tip portion and consists of segmented electrode pieces, wherein the first electrode and the second electrode form capacitive relationships with a sensor array coupled to the signal processing device, the sensor array forming a sensor surface and including first electrodes extending in a first direction and second electrodes extending in a second direction different from the first direction, the signal processing device configured to:

detect a first position pointed to by the pen-shaped position indicator on the sensor surface based on a first capacitive relationship between the first electrode of the pen-shaped position indicator from which a first transmission signal is transmitted and the first and second electrodes of the sensor array, sense signal levels of signals, based on a second capacitive relationship between the segmented electrode pieces of the second electrode from which a second transmission signal is transmitted and the first and second electrodes of the sensor array that are located adjacent to the first position, and determine a rotation angle of the pen-shaped position indicator on the sensor surface of the sensor array based on the first position and comparison of change in the signal levels of the signals sensed from the first and second electrodes of the sensor array that are located adjacent to the first position.

* * * * *